United States Patent
Kaneda et al.

(10) Patent No.: US 7,181,516 B2
(45) Date of Patent: Feb. 20, 2007

(54) METHOD FOR ALLOCATING STORAGE REGIONS AND PERFORMANCE GUARANTEE METHOD BASED ON HINTS, STORAGE DEVICE AND MANAGEMENT PROGRAM

(75) Inventors: Yasunori Kaneda, Sagamihara (JP); Takahiro Fujita, Yokohama (JP); Hirotaka Nakagawa, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 522 days.

(21) Appl. No.: 10/670,590

(22) Filed: Sep. 25, 2003

(65) Prior Publication Data

US 2005/0022201 A1 Jan. 27, 2005

(30) Foreign Application Priority Data

Jul. 1, 2003 (JP) ............................. 2003-189157

(51) Int. Cl.
G06F 15/173 (2006.01)

(52) U.S. Cl. ...................................... 709/223; 711/171
(58) Field of Classification Search ................ 709/223; 707/10; 711/114, 170–173
See application file for complete search history.

(56) References Cited

U.S. PATENT DOCUMENTS

| | | | | |
|---|---|---|---|---|
| 5,809,516 A | * | 9/1998 | Ukai et al. ................... | 711/114 |
| 6,516,344 B1 | * | 2/2003 | Nazari ......................... | 709/217 |
| 6,687,778 B2 | * | 2/2004 | Ito et al. ...................... | 710/301 |
| 6,732,232 B2 | * | 5/2004 | Krishnamurthy ............. | 711/114 |
| 6,886,035 B2 | * | 4/2005 | Wolff .......................... | 709/219 |
| 2002/0038391 A1 | | 3/2002 | Ido et al. | |
| 2002/0059287 A1 | * | 5/2002 | Karasudani et al. ........ | 707/100 |
| 2003/0004981 A1 | | 1/2003 | Kaneda | |
| 2003/0028739 A1 | * | 2/2003 | Li et al. ...................... | 711/170 |
| 2003/0033398 A1 | * | 2/2003 | Carlson et al. ............. | 709/223 |
| 2003/0093442 A1 | * | 5/2003 | Mogi et al. ................. | 707/203 |
| 2003/0204583 A1 | * | 10/2003 | Kaneda et al. .............. | 709/223 |
| 2003/0236884 A1 | | 12/2003 | Yamamoto et al. | |
| 2004/0098537 A1 | * | 5/2004 | Serizawa ..................... | 711/112 |
| 2004/0250041 A1 | | 12/2004 | Sollich | |

FOREIGN PATENT DOCUMENTS

JP 5298123 11/1993
JP 2002-108567 4/2002

* cited by examiner

*Primary Examiner*—Abdullahahi Salad
(74) *Attorney, Agent, or Firm*—Mattingly, Stanger, Malur & Brundidge, P.C.

(57) ABSTRACT

A storage device includes a storage for storing data to be accessed by a computer and an access processing module that controls data access between the storage and the computer. The storage device is equipped with a management interface, a storage region allocation module and a performance allocation module. The management interface receives from a management computer a storage region allocation request to allocate a storage region to the computer. The storage region allocation module allocates to the computer, according to the storage region allocation request, an unallocated storage region in the storage in a manner accessible by the computer. The performance allocation module allocates to the computer, according to the storage region allocation request, performance of at least one target module in the storage device that affects data access between the computer and the storage region allocated.

26 Claims, 21 Drawing Sheets

Fig. 3

| | Hard Disk No. | LBA Range | Hint | | | Storage Region No. |
|---|---|---|---|---|---|---|
| | | | ABW | ARH | ALH | |
| Allocated Storage Region | | | | | | |
| | | | | | | |
| | | | | | | |
| | | | | | | |
| Unallocated Storage Region | 181 | 0~209715199 | | | | |
| | 182 | 0~209715199 | | | | |
| | 183 | 0~209715199 | | | | |

ABW: Access Bandwidth Weight
ARH: Access Randomness Hint
ALH: Access Latency Hint

Fig. 4

| | Hard Disk No. | LBA Range | Hint | | | Storage Region No. |
|---|---|---|---|---|---|---|
| | | | ABW | ARH | ALH | |
| Allocated Storage Region | 181 | 0~41943039 | 10 | 10 | 0 | 91 |
| | | | | | | |
| | | | | | | |
| | | | | | | |
| Unallocated Storage Region | 181 | 41943040~209715199 | | | | |
| | 182 | 0~209715199 | | | | |
| | 183 | 0~209715199 | | | | |

ABW: Access Bandwidth Weight
ARH: Access Randomness Hint
ALH: Access Latency Hint

Fig. 5

| | Hard Disk No. | LBA Range | Hint | | | Storage Region No. |
| --- | --- | --- | --- | --- | --- | --- |
| | | | ABW | ARH | ALH | |
| Allocated Storage Region | 181 | 0~41943039 | 10 | 10 | 0 | 91 |
| | 182 | 0~41943039 | 8 | 0 | 0 | 92 |
| | | | | | | |
| | | | | | | |
| Unallocated Storage Region | 181 | 41943040~209715199 | | | | |
| | 182 | 41943040~209715199 | | | | |
| | 183 | 0~209715199 | | | | |

ABW: Access Bandwidth Weight
ARH: Access Randomness Hint
ALH: Access Latency Hint

Fig. 6

| | Hard Disk No. | LBA Range | Hint | | | Storage Region No. |
| --- | --- | --- | --- | --- | --- | --- |
| | | | ABW | ARH | ALH | |
| Allocated Storage Region | 181 | 0~41943039 | 10 | 10 | 0 | 91 |
| | 182 | 0~41943039 | 8 | 0 | 0 | 92 |
| | 181 | 41943040~44040191 | 1 | 10 | 10 | 93 |
| | | | | | | |
| Unallocated Storage Region | 181 | 44040192~209715199 | | | | |
| | 182 | 41943040~209715199 | | | | |
| | 183 | 0~209715199 | | | | |

ABW: Access Bandwidth Weight
ARH: Access Randomness Hint
ALH: Access Latency Hint

Fig. 7

| | Hard Disk No. | LBA Range | Hint | | | Storage Region No. |
|---|---|---|---|---|---|---|
| | | | ABW | ARH | ALH | |
| Allocated Storage Region | 181 | 0~ 41943039 | 10 | 10 | 0 | 91 |
| | 182 | 0~ 41943039 | 8 | 0 | 0 | 92 |
| | 181 | 41943040~ 44040191 | 1 | 10 | 10 | 93 |
| | 183 | 0~ 2097151 | 10 | 0 | 0 | 94 |
| Unallocated Storage Region | 181 | 44040192~ 209715199 | | | | |
| | 182 | 41943040~ 209715199 | | | | |
| | 183 | 2097152~ 209715199 | | | | |

ABW: Access Bandwidth Weight
ARH: Access Randomness Hint
ALH: Access Latency Hint

Fig. 8

| | Hard Disk No. | LBA Range | Hint | | | Storage Region No. |
|---|---|---|---|---|---|---|
| | | | ABW | ARH | ALH | |
| Allocated Storage Region | 182 | 0~ 41943039 | 8 | 0 | 0 | 92 |
| | 181 | 41943040~ 44040191 | 1 | 10 | 10 | 93 |
| | 183 | 0~ 2097151 | 10 | 0 | 0 | 94 |
| | | | | | | |
| Unallocated Storage Region | 181 | 44040192~ 209715199 | | | | |
| | 182 | 41943040~ 209715199 | | | | |
| | 183 | 0~ 209715199 | | | | |

ABW: Access Bandwidth Weight
ARH: Access Randomness Hint
ALH: Access Latency Hint

Fig. 10

| FC Interface No. | Storage Region No. | WWN of Accessible Computer | Access Ratio (Band) |
|---|---|---|---|
| 111 | | | |
| | | | |
| | | | |
| 112 | | | |
| | | | |

| FC Interface No. | Storage Region No. | WWN of Accessible Computer | Access Ratio (Band) |
|---|---|---|---|
| 111 | 91 | 301 | 80% |
| | | | |
| | | | |
| 112 | | | |
| | | | |

| FC Interface No. | Storage Region No. | WWN of Accessible Computer | Access Ratio (Band) |
|---|---|---|---|
| 111 | 91 | 301 | 80% |
|  |  |  |  |
|  |  |  |  |
| 112 | 92 | 302 | 60% |
|  |  |  |  |

| FC Interface No. | Storage Region No. | WWN of Accessible Computer | Access Ratio (Band) |
|---|---|---|---|
| 111 | 91 | 301 | 80% |
|  | 93 | 302 | 10% |
|  |  |  |  |
| 112 | 92 | 302 | 60% |
|  |  |  |  |

| FC Interface No. | Storage Region No. | WWN of Accessible Computer | Access Ratio (Band) |
|---|---|---|---|
| 111 | 93 | 302 | 10% |
|  |  |  |  |
|  |  |  |  |
| 112 | 92 | 302 | 60% |
|  |  |  |  |

| Access Bandwidth Weight | Parameter to be set for Band Control Module |
|---|---|
| 0 | 5% |
| 1 | 10% |
| 2 | 15% |
| 3 | 20% |
| 4 | 25% |
| 5 | 30% |
| 6 | 40% |
| 7 | 50% |
| 8 | 60% |
| 9 | 70% |
| 10 | 80% |

| AccessLatencyHint \ AccessRandomnessHint | Dedicated Cache Allocation Rate | |
|---|---|---|
| | 0~5 | 6~10 |
| 0 | 0% | 0% |
| 1 | 1% | 10% |
| 2 | 2% | 20% |
| 3 | 3% | 30% |
| 4 | 4% | 40% |
| 5 | 5% | 50% |
| 6 | 6% | 60% |
| 7 | 7% | 70% |
| 8 | 8% | 80% |
| 9 | 9% | 90% |
| 10 | 10% | 100% |

Fig. 17 (A)

| | Storage Region No. | Cache Capacity |
|---|---|---|
| Allocated Cache | | |
| | | |
| | | |
| Unallocated Cache | | 4GB |

| | Storage Region No. | Cache Capacity |
|---|---|---|
| Allocated Cache | 93 | 1GB |
| | | |
| | | |
| Unallocated Cache | | 3GB |

| FC Interface No. | Performance |
|---|---|
| 111 | 1Gbps |
| 112 | 1Gbps |

| FC Interface No. | Performance |
|---|---|
| 116 | 2Gbps |
| 117 | 2Gbps |

| Access Bandwidth Weight | Parameter to be set at Band Control Module | |
|---|---|---|
| | 1Gbps | 2Gbps |
| 0 | 10% | 5% |
| 1 | 20% | 10% |
| 2 | 30% | 15% |
| 3 | 40% | 20% |
| 4 | 50% | 25% |
| 5 | 60% | 30% |
| 6 | 80% | 40% |
| 7 | * | 50% |
| 8 | * | 60% |
| 9 | * | 70% |
| 10 | * | 80% |

METHOD FOR ALLOCATING STORAGE REGIONS AND PERFORMANCE GUARANTEE METHOD BASED ON HINTS, STORAGE DEVICE AND MANAGEMENT PROGRAM

BACKGROUND OF THE INVENTION

1. Field of the Invention

The present invention relates to an allocation control technology for allocating storage regions in a storage device.

2. Related Background Art

In large-scale storage devices such as disk array devices, modules are provided for creating storage regions, which are used by computers to store information inside the storage devices. However, the modules for creating storage regions have different interfaces and/or request formats depending on the vendor that manufactures each storage device. For this reason, when storage devices made by different vendors are combined, an administrator of the storage devices must learn different interfaces and/or request formats of various vendors, which is a major problem in large-scale computer systems. To address this problem, DMTF (Distributed Management Task Force) devised CIM (Common Information Model) and WBEM (Web-Based Enterprise Management), which define interfaces and request formats when creating storage regions in storage devices. By using interfaces defined by CIM, storage regions can be readily created using a standardized method in storage devices manufactured by different vendors. Interfaces and request formats for creating storage regions and defined by CIM utilize "hints" to create storage regions, as follows (excerpted from Device27_StorageServices.mof):
//========================================================
// StorageSettingWithHints
//
========================================================
[Experimental, Version ("2.7.1"), Description (
    "This subclass of StorageSetting allows a client to specify "
    "'hint's for optimization of the volume performance. The effect "
    "of these hints is implementation dependent.") ]
class CIM_StorageSettingWithHints: CIM_StorageSetting {
    [MinValue (0), MaxValue (10), Description (
        "This hint is an indication from a client of the importance "
        "placed on data availability. Values are 0=Don't Care to "
        "10=Very Important.") ]
    uint16 DataAvailabilityHint;
    [MinValue (0), MaxValue (10), Description (
        "This hint is an indication from a client of the randomness "
        "of accesses. Values are 0=Entirely Sequential to "
        "10=Entirely Random.") ]
    uint16 AccessRandomnessHint;
    [MinValue (0), MaxValue (10), Description (
        "This hint is an indication from a client of the direction "
        "of accesses. Values are 0=Entirely Read to "
        "10=Entirely Write.") ]
    uint16 AccessDirectionHint;
    [Description (
        "This hint is an indication from a client of the optimal "
        "access sizes. Several sizes can be specified."),
        Units ("MegaBytes") ]
    uint16 AccessSizeHint [];
    [MinValue (0), MaxValue (10), Description (
        "This hint is an indication from a client how important "
        "access latency is. Values are 0=Don't Care to "
        "10=Very Important.") ]
    uint16 AccessLatencyHint;
    [MinValue (0), MaxValue (10), Description (
        "This hint is an indication from a client of bandwidth "
        "prioritization. Values are 0=Don't Care to "
        "10=Very Important.") ]

-continued uint16 AccessBandwidthweight;
    [MinValue (0), MaxValue (10), Description (
        "This hint is an indication of the importance the client "
        "places on the cost of storage. Values are 0=Don't Care to "
        "10=Very Important. A StorageVolume provider might choose "
        "to place data on low cost or high cost drives based on "
        "this parameter.") ]
    uint16 StorageCostHint;
    [MinValue (0), MaxValue (10), Description (
        "This hint is an indication of the importance placed on "
        "storage efficiency by the client. Values are 0=Don't Care "
        "to 10=Very Important. A StorageVolume provider might choose "
        "different RAID levels based on this hint.") ]
    uint16 StorageEfficiencyHint;
};

By using "hints," storage regions to be created can be designated abstractly. Due to the fact that the creation of storage regions can be instructed using "hints," an advantage of being able to provide a standardized request format, even if the hardware configuration of storage devices by various vendors is completely different, can be gained.

Also, there is a known method for controlling bands between computers and storage regions. Furthermore, RSVP (Resource ReSerVation Protocol (RFC2205)) is devised by the IETF (The Internet Engineering Task Force) for IP (Internet Protocol).

In order to create storage regions with band control based on prior arts, first an interface and a request format defined in CIM devised by DMTF, as well as hints, are utilized to create storage regions. Hints designated by an administrator include design concepts (policy) as to how storage regions created should be utilized by computers. Next, bands are set in a storage device in order to set bands between the computers and the storage regions. However, since band setting on storage devices is not defined in CIM defined by DMTF, the bands must be set by fully utilizing interfaces and request formats that differ by vendors. Furthermore, setting parameters for band control must be selected and set, so that they would satisfy hints that were designated when storage regions were created. Consequently, the administrator must have the know-how to select band setting parameters that correspond to hints that were provided when storage regions were created, which means that the administrator requires high-level knowledge. Furthermore, there is a risk that the administrator would select wrong band setting parameters, and there is no way to prevent this.

SUMMARY OF THE INVENTION

The present invention has been conceived in view of the above, and relates to a technology to automate settings by an administrator for guaranteeing access performance from computers to allocated storage regions, by allocating storage regions using region allocation request principles (hints) for storage regions that are designated when storage regions are allocated, and by using the hints to execute performance guarantee for band control.

A storage device in accordance with one embodiment of the present invention comprises: at least one storage for storing data to be accessed by at least one computer; an access processing module that controls data access between the at least one storage and the at least one computer; a management interface that receives from a management computer a storage region allocation request to allocate a storage region to the at least one computer; a storage region allocation module that allocates to the at least one computer, according to the storage region allocation request, an unallocated storage region in the at least one storage in a manner accessible by the at least one computer; and a performance allocation module that allocates to the at least one computer, according to the storage region allocation request, performance of at least one target module that affects data access between the at least one computer and the storage region allocated.

In accordance with another embodiment of the present invention, a management program to be executed by a management computer is provided. The management computer is connected to a storage device and a computer. The storage device includes a storage region that is capable of storing data to be accessed by the computer, and an access processing module which controls data access between the computer and the storage device. The management program makes the management computer to execute: a procedure of receiving a storage region allocation request to allocate a storage region to the at least one computer; a procedure of receiving from the storage device actual performance values of a plurality of target modules in the storage device; a procedure of instructing the storage device to allocate to the at least one computer, according to the storage region allocation request, an unallocated storage region in the at least one storage in a manner accessible by the at least one computer; and a procedure of instructing the storage device to specify at least one of the plurality of target modules to allocate, according to the storage region allocation request and the actual performance values of the plurality of target modules, performance of the at least one target module that affects data access between the at least one computer and the storage region allocated, and to allocate the performance of the at least one of the plurality of target modules specified to the at least one computer.

Other objects, features and advantages of the invention will become apparent from the following detailed description taken in conjunction with the accompanying drawings.

BRIEF DESCRIPTION OF THE DRAWINGS

FIG. 3 is a diagram of a mapping table A.

FIG. 4 is a diagram of a mapping table B.

FIG. 5 is a diagram of a mapping table C.

FIG. 6 is a diagram of the mapping table A.

FIG. 7 is a diagram of the mapping table A.

FIG. 8 is a diagram of the mapping table A.

FIG. 10 is a diagram of a read/write processing table A.

FIG. 11 is a diagram of a read/write processing table B.

FIG. 12 is a diagram of a read/write processing table C.

FIG. 13 is a diagram of a read/write processing table D.

FIG. 14 is a diagram of a read/write processing table E.

FIGS. 16(A) and 16(B) are diagrams of a band parameter calculation table and a cache capacity calculation table.

FIGS. 17(A) and 17(B) are diagrams of cache allocation tables.

FIGS. 24(A) and 14(B) are diagrams of performance information.

FIG. 25 is a diagram of a band parameter calculation table according to the fourth embodiment.

DESCRIPTION OF THE PREFERRED EMBODIMENTS

Preferred embodiments of the present invention are described below with reference to the accompanying drawings.

[System Configuration]

Figure 1:
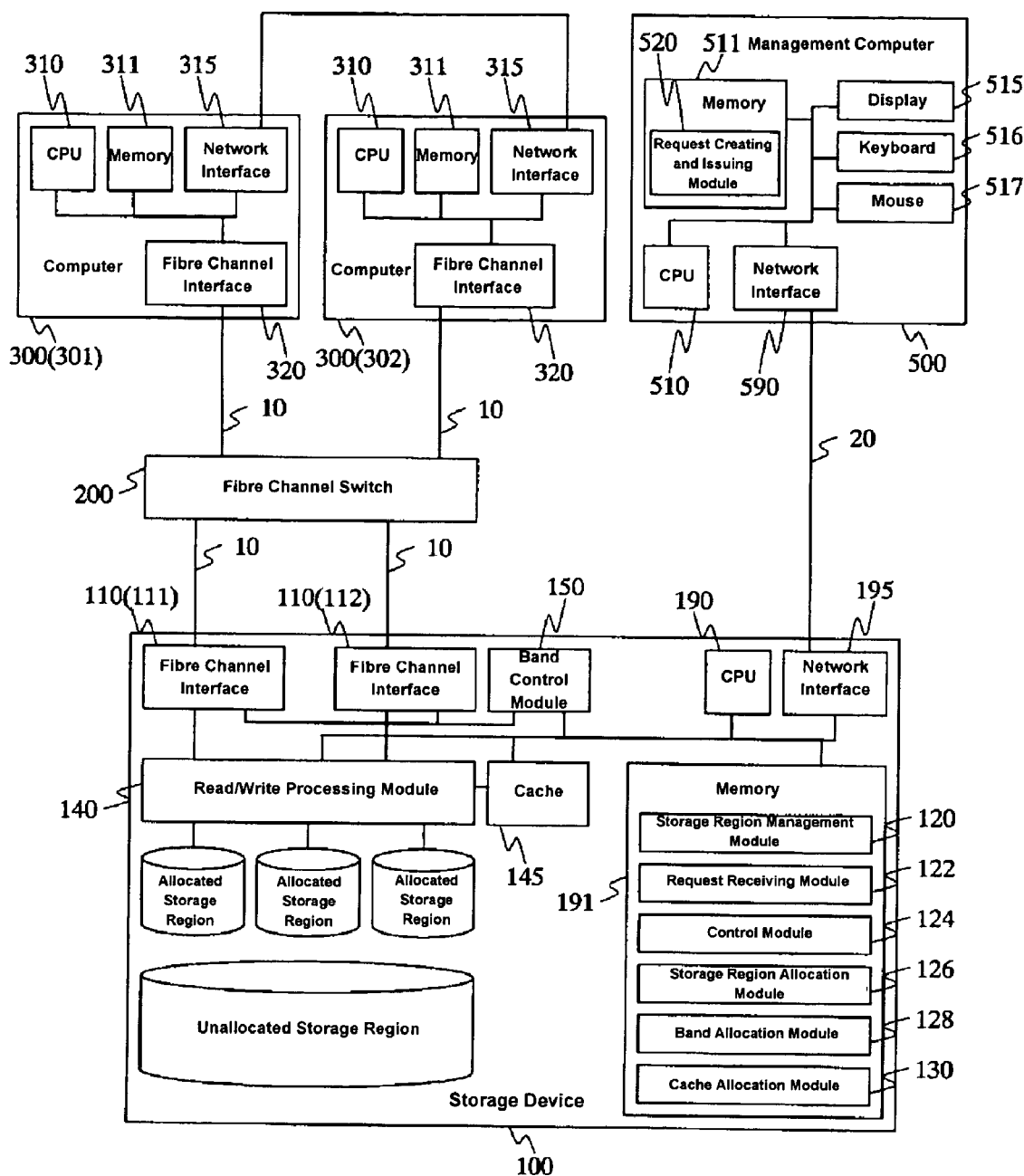
FIG. 1 is a diagram of the configuration of a computer system in accordance with a first embodiment of the present invention.

FIG. 1 shows a system configuration in accordance with a first embodiment of the present invention. In the system shown in FIG. 1, two computers 300 (called 301 and 302 when differentiating between the two) are connected to a storage device 100 via a fibre channel switch 200. To connect the computers 300 to the fibre channel switch 200 and the fibre channel switch 200 to the storage device 100, fibre channels 10 are used. The present system is also provided with a management computer 500 to control the allocation and release of storage regions of the storage device 100. The management computer 500 and the storage device 100 are connected by a dedicated communication line 20. The present invention is not limited in any way by the number of computers or storage devices.

[Computers]

The computers 300 in FIG. 1 each comprises a CPU 310 for governing the execution of programs, a memory 311 for storing the programs and information required for the execution of the programs, a network interface 315 for communicating with the other computer 300, and a fibre channel interface (hereinafter called "FC interface") 320 for exchanging data with the storage device 100. Each of the computers 300 can store, via the FC interface 320, data generated through the execution of the programs in storage regions allocated in the storage device 100. Furthermore, each of the computers 300 can obtain, via the FC interface 320, the programs themselves or data required for the execution of the programs from storage regions allocated in the storage device 100. Each of the FC interfaces 320 has an identification number called WWN (World Wide Name). The WWN is a unique number assigned to each FC interface, and this allows the storage device 100 to determine which FC interface 320 issued a request. In the system shown in FIG. 1, the WWNs are used as identification numbers to identify the computers 300. Although the WWN is actually represented in eight bytes, the numbers 301 and 302 assigned to the computers 300 are used as the WWNs for convenience according to the present embodiment.

[Storage Device]

The storage device 100 in FIG. 1 is provided with two FC interfaces 110 (called 111 and 112 when differentiating between the two). The FC interfaces 110 are provided with a band control module 150. Storage regions of the storage device 100 can be roughly divided into allocated storage regions and unallocated storage regions, both of which are managed by a storage region management module 120. The allocated storage regions are connected to the FC interfaces 110 through a read/write processing module 140, which makes them available for use by the computers 300. The storage device 100 is provided with a request receiving module 122 for receiving allocation requests and release requests for storage regions from the management computer 500; a control module 124 for interpreting and executing requests received by the request receiving module 122; a storage region allocation module 126 for retrieving required storage regions from the unallocated storage regions according to allocation requests, and for connecting the storage regions with the FC interfaces 110; a band allocation module 128 for setting band control parameters for the band control module 150; and a cache allocation control module 130 for allocating caches to the storage regions. The band control module 150 is one of performance allocation modules for controlling the FC interfaces 110 in order to guarantee the performance that affects data access between the computers 300 and the allocated storage regions according to parameters set in accordance with storage region allocation requests. The cache allocation control module 130 is one of performance allocation modules for controlling allocation volumes of caches that affect data access between the computers 300 and the allocated storage regions according to parameters set in accordance with storage region allocation requests.

In the meantime, data read/write requests from the computers 300 are received by the FC interfaces 110 and processed by the read/write processing module 140. The read/write processing module 140 interprets read/write requests received from the computers 300 and stores data in designated storage regions or obtains data from designated storage regions, based on a mapping table 121 managed by the storage region control module 120.

Figure 2:
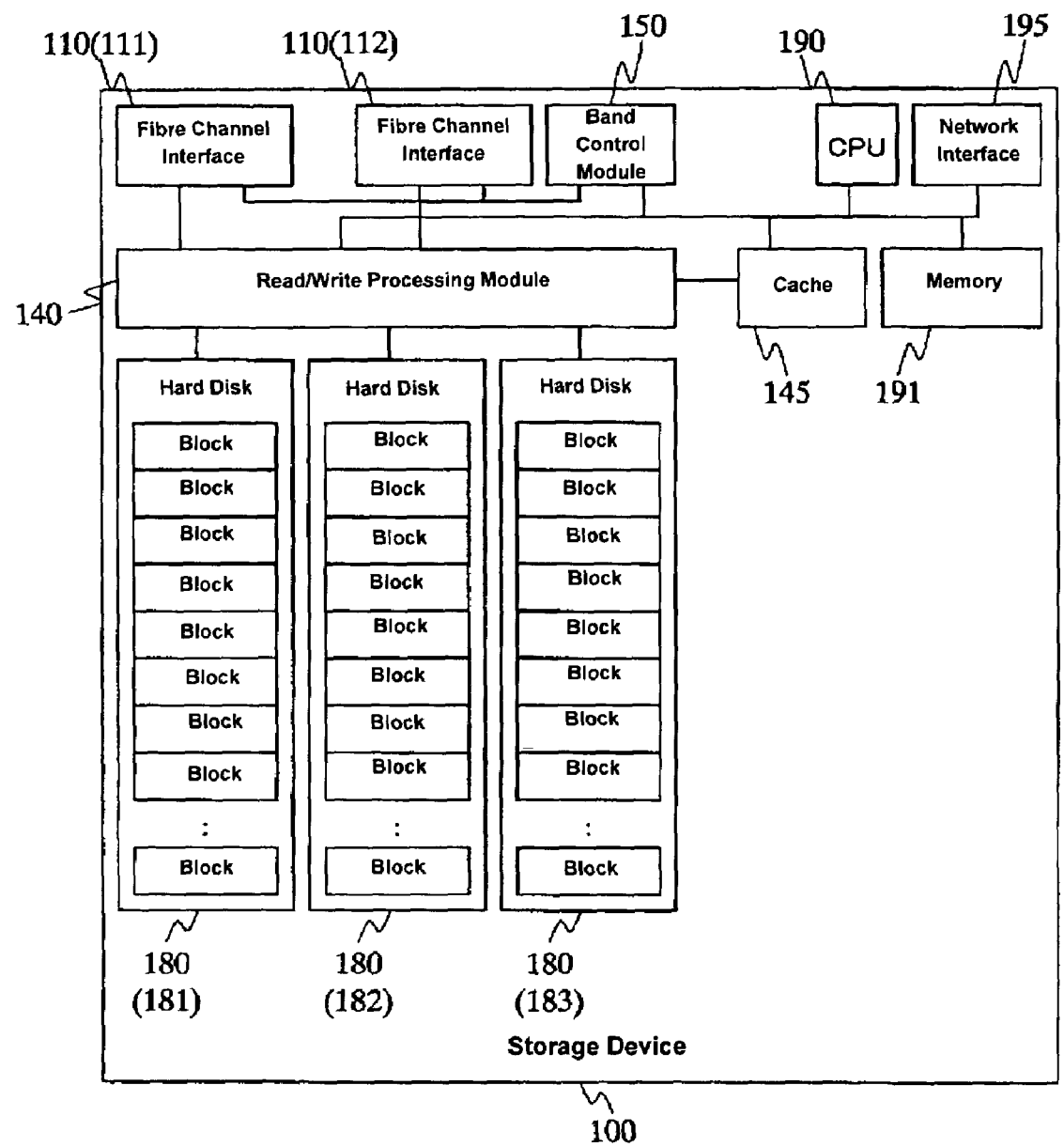
FIG. 2 is a diagram of the hardware configuration of a storage device.

FIG. 2 is a diagram of the hardware configuration of the storage device 100. The storage device 100 includes a CPU 190 for governing the execution of programs, a memory 191 that stores the programs, a network interface 195 for communicating with the management computer 500, the FC interfaces 110, a plurality of hard disk devices 180 that form the storage regions, and a cache 145 for temporarily storing data to be stored in the hard disk devices 180 and data received from the computers 300. The storage region management module 120, the request receiving module 122, the control module 124, the storage region allocation module 126, the band allocation module 128, the cache allocation control module 130 and the band control module 150 are stored in the memory 191; their functions are realized when the CPU 190 executes the programs. Furthermore, information required for executing various modules, such as the mapping table 121, a band parameter calculation table 129, a cache capacity calculation table 131, a cache allocation table 139 and a read/write processing table 141, which are described later, are also stored in the memory 191.

[Storage of Programs]

The storage region management module 120, the request receiving module 122, the control module 124, the storage region allocation module 126, the band allocation module 128, the cache allocation control module 130 and the band control module 150, which are stored in the memory 191 of the storage device 100, are recorded as programs on non-volatile recording media such as ROM or magnetic disk devices within the storage device 100, and are loaded onto the memory 191 and executed when the storage device 100 is activated. Media for recording the programs can be recording media other than ROM or magnetic disk devices (e.g., CD-ROM or Floppy® disks). Furthermore, the programs can be loaded onto the computers 300 from the recording media and executed or can be loaded by accessing the storage media via a network.

[Management of Storage Regions]

The storage device 100 provides storage regions on a plurality of hard disks 180 (there are three hard disks according to the present embodiment and they are called 181, 182 and 183 when differentiating them). According to the present embodiment, the capacity of one hard disk 180 may be for example 100 GB. Normally, a hard disk manages its storage capacity in blocks, each comprising 512 bytes (i.e., the minimum unit for read/write processing). In a hard disk with a capacity of 100 GB, there are 209,715,200 blocks. Each of the blocks is identified by a number called LBA (Logical Block Address) assigned to each block. In a hard disk with a capacity of 100 GB, the numbers 0–209, 715,199 are assigned in sequence from the first block.

FIGS. 3 through 8 shows diagrams of the mapping table 121.

The storage region management module 120 uses the mapping table 121 shown in FIGS. 3–8 to manage allocated storage regions and unallocated storage regions in terms of hard disk numbers and LBA ranges. In the example shown in FIG. 3, there are no allocated storage regions and the hard disks 181, 182, 183 are entirely unallocated. (In FIGS. 3–8, the hard disk numbers correspond to the hard disk numbers in FIG. 2.) In the example shown in FIG. 4, LBAs 0–41, 943,039 of the hard disk 181 are allocated as a storage region number 91.

[Mechanisms of Access Control and Band Control]

Next, referring to FIG. 9, the mechanisms of an access control and a band control of the storage device 100 will be described.

Figure 9:
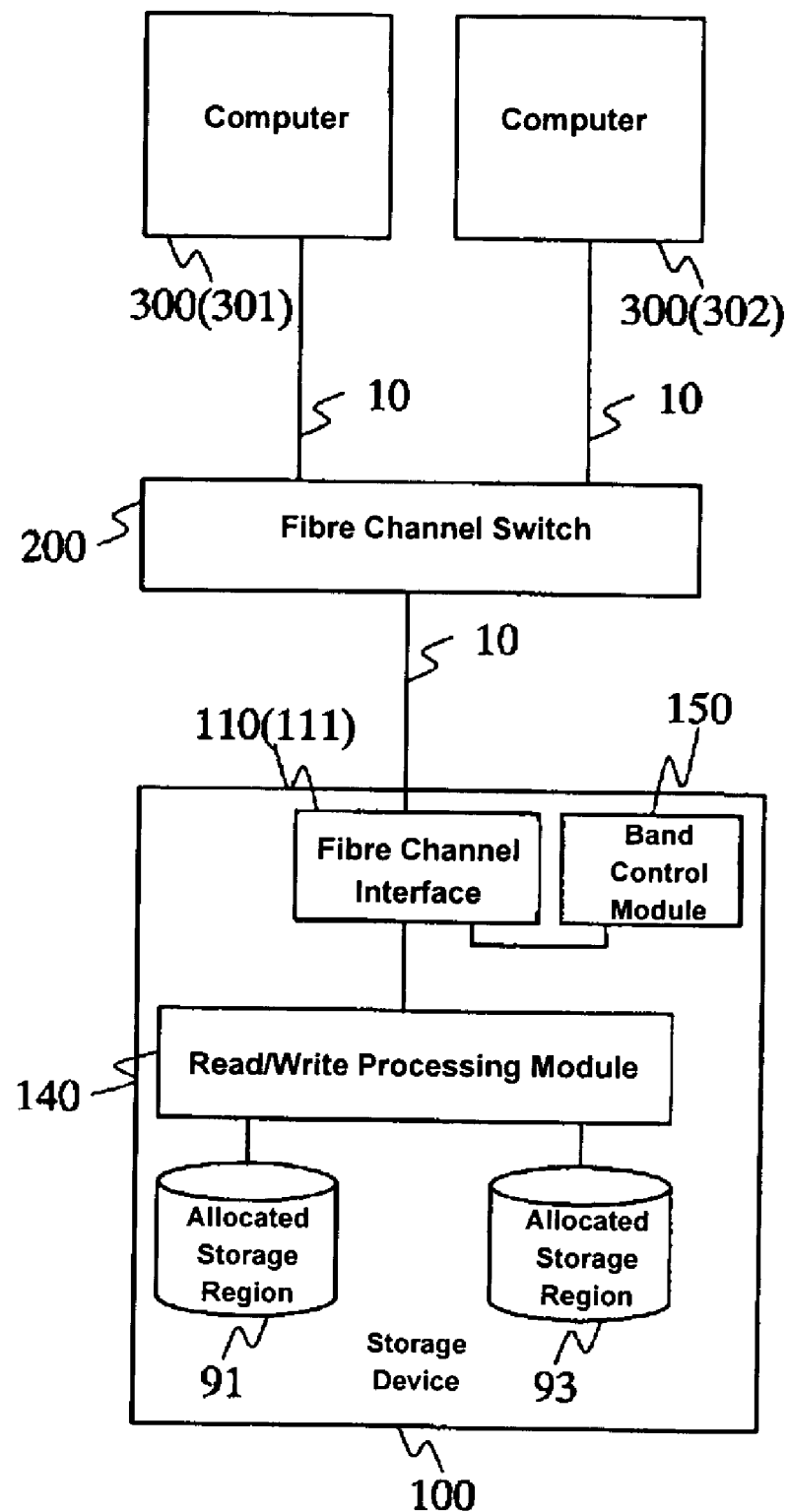
FIG. 9 is a pattern drawing illustrating an access control and a band control.

FIG. 9 is a pattern diagram to illustrate the access control and the band control. In FIG. 9, the two computers 301 and 302 are connected to the storage device 100 via the fibre channel switch 200. The storage device 100 has two allocated storage regions 91 and 93, both of which are connected to one of the FC interfaces, the FC interface 111. In this configuration, the two computers 301 and 302 share the same FC interface 111.

FIGS. 10–14 are diagrams of the read/write processing table 141. The read/write processing module 140 and the band control module 150 use the read/write processing table 141 shown in FIGS. 10–14 to perform the access control and the band control of the storage regions for the computers 300. The access control is governed by the read/write module 140, while the band control is governed by the band control module 150. For example, according to the read/write processing table 141 shown in FIG. 13, the two allocated storage regions 91 and 93 are connected to the FC interface 111, where the WWN301 (i.e., the computer 301) can access (i.e., can perform read/write processing for) the storage region 91 and the WWN302 (i.e., the computer 302) can access the storage region 93. The read/write processing module 140 performs the access control in accordance with the information in the read/write processing table 141. In other words, the read/write processing module 141 makes only the storage region 91 available for access in response to read/write requests from the computer 301 and only the storage region 93 available for access in response to read/write requests from the computer 302. If a read/write request from the computer 301 and a read/write request from the computer 302 occur simultaneously in the FC interface 111 shared by the computers 301 and 302, the band control module 150 follows an access ratio stored in the read/write processing table 141, so that when accesses from the computer 302 and the computer 301 compete with each other, the band control module 150 controls the accesses in the ratio of 80% for the access from the computer 301 and 10% for the access from the computer 302.

[Management Computer]

The management computer 500 shown in FIG. 1 comprises a CPU 510 for governing the execution of programs, a memory 511 for storing programs and information required for the execution of the programs, a display 515 for displaying the execution status of the programs, a keyboard 516 and an input device such as a mouse 517 for inputting an administrator's instructions, a request creating and issuing module 520 for creating and issuing allocation requests and release requests for storage regions to the storage device 100, and a network interface 590 for connecting with the storage device 100.

Figure 15:
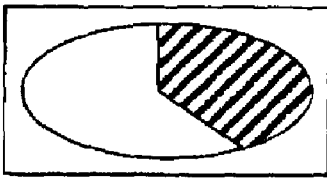
FIG. 15 is a of screens provided by a management computer.

FIGS. 15(A) and 15(B) show diagrams of screens provided by the management computer 500. The screens shown in FIGS. 15(A) and 15(b) are displayed on the display 515 of the management computer 500 to allow the administrator to create or delete storage regions and manage the status of the storage regions. FIG. 15(A) is a storage region creating screen 610. The storage region creating screen 610 comprises an input field 611 for designating the computer to which a storage region is allocated, an input field 612 for designating the capacity of the storage region to be created, three input fields 613–615 for inputting hints for creating the storage region, and a creating button 619 for instructing the creation of the storage region. FIG. 15(B) is a screen 620 for displaying a list of storage regions and instructing deletions of storage regions. The screen 620 comprises a display region 621 for displaying allocated storage regions for each of the computers issues allocation requests for allocating storage regions to the storage device 100 in accordance with an interface and request format stipulated by CIM and WBEM of DMTF. Hints used when issuing allocation requests are of eight types as indicated in Related Background Art section above: DataAvailabilityHint, AccessRandomnessHint, AccessDirectionHint, AccessSizeHint, AccessLatencyHint, AccessBandwidthWeight, StorageCostHint, and StorageEfficiencyHint; however, let us narrow down the hints to AccessBandwidthWeight, AccessRandomnessHint and AccessLatencyHint in the present embodiment to describe the present invention. The present embodiment may be applicable to all of the hints. Furthermore, hints defined by something other than CIM may also be applicable.

[Allocation Sequence]

Next, referring to the drawings, the allocation of storage regions and band settings, which relate to at least a part of characteristics of the present invention, will be described. In the present embodiment, let us assume that the state indicated by FIGS. 3 and 10 is an initial state in which all storage regions are unallocated. Furthermore, referring to flowcharts in FIGS. 20–23, the flow of the processing will be described.

Figure 20:
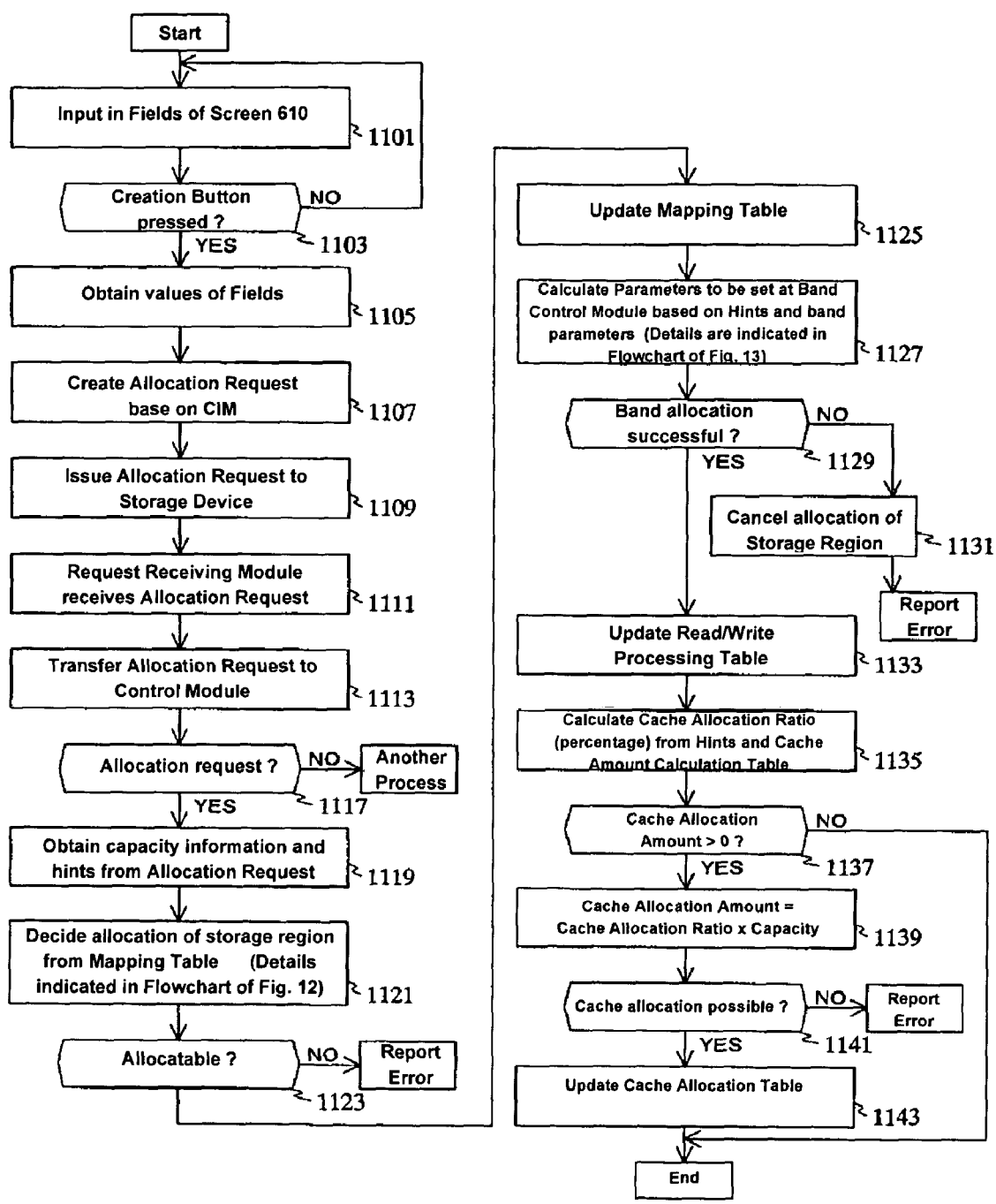
FIG. 20 is a flowchart of an allocation processing for storage regions, bands, and caches based on hints.
Figure 21:
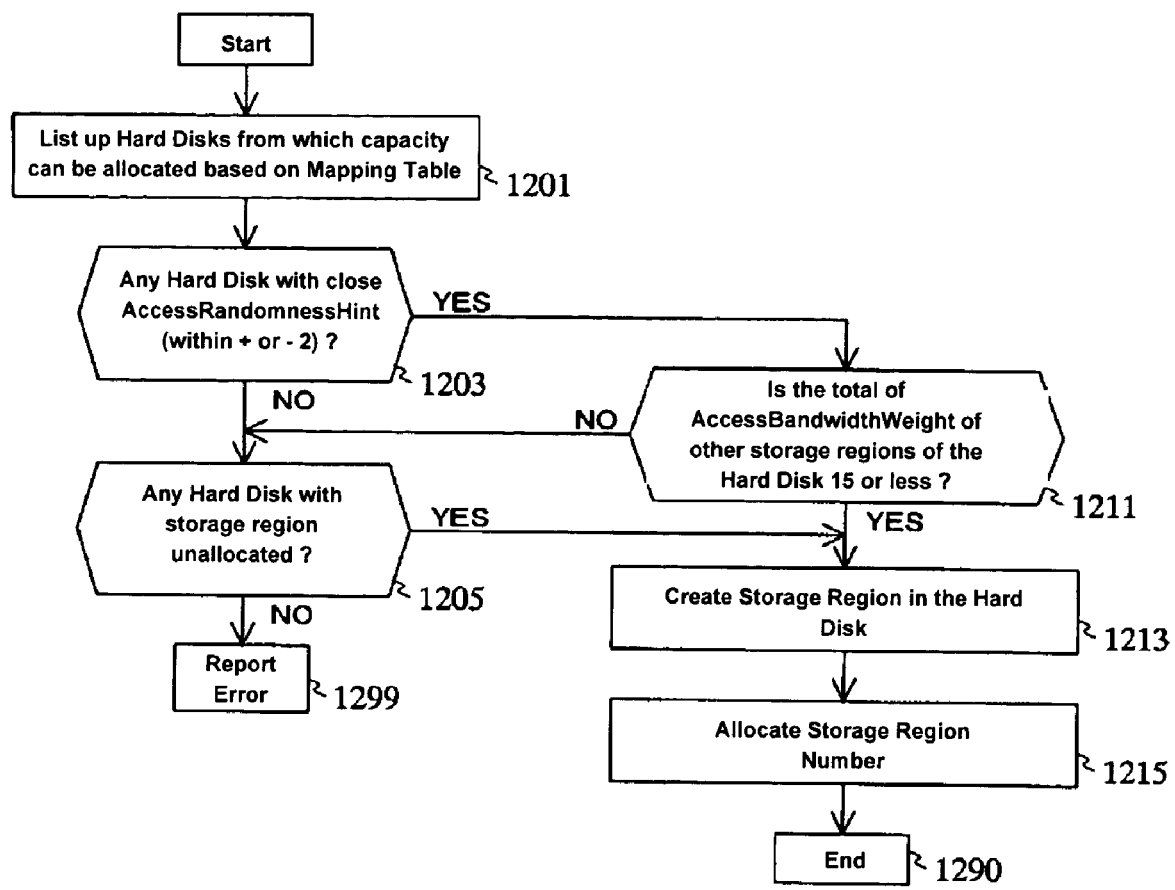
FIG. 21 is a flowchart of an allocation processing for storage regions.
Figure 22:
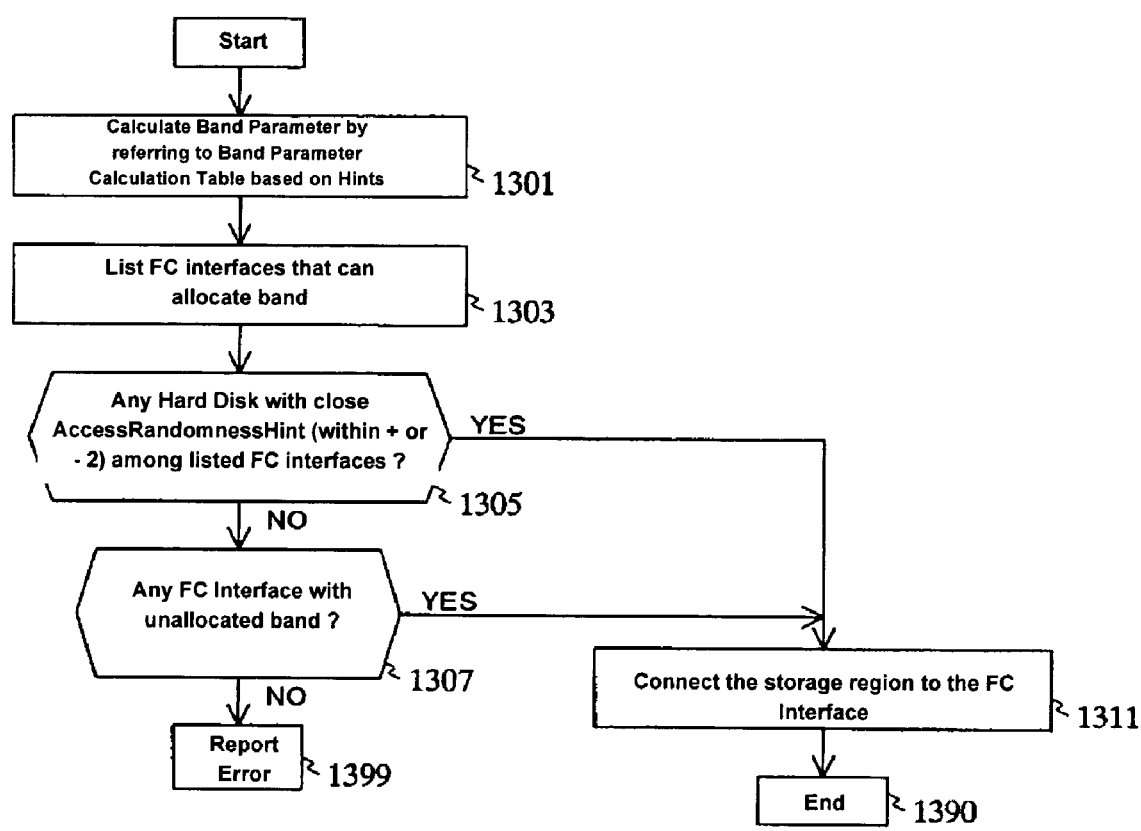
FIG. 22 is a flowchart of an allocation processing for bands.

FIG. 20 is a flowchart of a processing for allocating a storage region based on hints and for guaranteeing performance. FIG. 21 is a flowchart of an allocation processing for a storage region. FIG. 22 is a flowchart of a processing for guaranteeing a band.

[Creating the First Storage Region 91 from the Initial State]

Let us assume that an administrator operates the management computer 500 in order to allocate a storage region to the computer 301. The administrator uses the screen 610 displayed on the management computer 500 to instruct the creation of a storage region. The administrator inputs (1101) the following values, for example:

"301" in the input field 611 for designating a computer;
"20 GB" in the input field 612 for designating the capacity of the storage region; and
"10" for AccessBandwidthWeight,
"10" for AccessRandomnessHint,
"0" for AccessLatencyHint in the respective fields 613–615 for inputting hints for creating a storage region; and the administrator presses the creating button 619 (1103). The management computer 500 obtains values inputted into the various input fields (1105), creates an allocation request based on CIM (1107), and issues the allocation request to the storage device 100 (1109). The allocation request created by the management computer 500 is issued by the CPU 510 of the management computer 500 to the storage device 100 via the network interface 590. The request receiving module 122 of the storage device 100 receives via the network interface 195 the allocation request issued by the management computer 500 (1111). The request receiving module 122, upon receiving the allocation request, sends the allocation request to the control module 124 (1113). The control module 124 analyzes the request and determines that the request is an allocation request (1117). Upon determining that the request is an allocation request, the control module 124 first obtains the capacity to be created and the hints (1119). The control module 124 sends the capacity to be created and the hints to the storage region allocation module 126 and requests the allocation of a storage region. The storage region allocation module 126 uses the mapping table 121 to determine which hard disk the designated storage region (20 GB in the present example) should be allocated from based on the hints (1121). Details of an algorithm for selecting the hard disk on which to form a storage region are indicated in the flowchart in FIG. 21. In the state shown in FIG. 3, since all of the hard disks are unused (1205), 20 GB (LBAs 0–41,943,039) is allocated from the hard disk with the smallest number, or the hard disk 181 (1213). The storage region allocation module 126 assigns the number 91 as the storage region number (1215) and updates the mapping table 121 as indicated in FIG. 4 (1125). The updated mapping table 121 stores values for the AccessBandwidthWeight, AccessRandomnessHint and AccessLatencyHint that were received as hints. When the allocation of the storage region is completed, the storage region allocation module 126 notifies the control module 124 of the completion.

Next, the control module 124 sends the hints to the band allocation module 128 and requests the selection of an FC interface to connect the storage region to and the calculation of a parameter to be set for the band control module 150. The band allocation module 128 calculates the parameter to be set for the band control module 150 based on the hints (1127).

FIG. 16 shows the band parameter calculation table 129 and the cache capacity calculation table 131. According to the present embodiment, parameters are found by using the band parameter calculation table 129 shown in FIG. 16(A). The band parameter calculation table 129 is a table for converting the AccessBandwidthWeight in a value of 0 to 10 into a parameter to be provided to the band control module 150. A flowchart of an algorithm for selecting the FC interface to connect a storage region to is described using FIG. 22. In the setting as described earlier, when the AccessBandwidthWeight is "10," the parameter to be set for the band control module 150 is "80%" (1301). Next, the band allocation module 128 refers to the read/write processing table 141 and searches for an FC interface that can allocate 80% of its band (1303). As shown in FIG. 10, since there are no storage regions allocated to any of the FC interfaces and the FC interfaces are therefore in an initial state (1307), the band allocation module 128 connects the storage region 91 to the FC interface with the smallest number, i.e., the FC interface 111 (1311). Due to the fact that the computer that is authorized to access is the computer 301, the read/write processing table 141 is updated by the band allocation module 128 as indicated in FIG. 11 (1133). Upon completing the allocation of the band, the band allocation module 128 notifies the control module 124 of the completion.

Next, the control module 124 sends the hints to the cache allocation control module 130 and requests the selection of a dedicated cache capacity to be allocated to the storage region 91. The cache allocation control module 130 uses the cache capacity calculation table 131 shown in FIG. 16(B) to calculate the cache capacity to be allocated to the storage region 91 (1135). The cache capacity calculation table 131 is a table for calculating the dedicated cache capacity to be allocated to a storage region based on the AccessLatencyHint and the AccessRandomnessHint, whose values range between 0 and 10. The cache allocation control module 130 finds the percentage of cache to the capacity of the storage region 91 based on the AccessLatencyHint, and calculates the allocation volume for the cache by multiplying the percentage with the capacity of the storage region 91. According to the hints given before, since the AccessLatencyHint is "0" (1137), the cache allocation control module 130 does not allocate any dedicated cache to the storage region 91 and notifies the control module 124 of the completion of the processing.

The control module 124 notifies the request receiving module 122 of the completion of the allocation request. The request receiving module 122 notifies the management computer 500 of the completion of the allocation request.

Based on the above, a 20 GB storage region requested by the administrator is created in the storage device 100 and becomes available for use from the computer 301. By processing as described above, the band between the computer 301 and the storage region 91 can be set based on hints for the storage region 91, which was also created based on hints. As a result, there is no need to set a band using a different module after creating a storage region. Further, a band can be set without making any changes to the conventional interface and request format of CIM.

[Creating the Second Storage Region 92]

Further, let us assume that the administrator operates the management computer 500 in order to allocate a storage region to the computer 302. The administrator uses the screen 610 displayed on the management computer 500 to instruct the creation of a storage region. The administrator inputs (1101) the following, for example:

"302" in the input field 611 for designating a computer;
"20 GB" in the input field 612 for designating the capacity of the storage region; and
"8" for AccessBandwidthWeight,
"0" for AccessRandomnessHint,
"0" for AccessLatencyHint in the respective fields 613–615 for inputting hints for creating a storage region; and the administrator presses the creating button 619 (1103). The management computer 500 obtains values inputted into the various input fields (1105), creates an allocation request based on CIM (1107), and issues the allocation request to the storage device 100 (1109). The allocation request created by the management computer 500 is received by the request receiving module 122 (1111) and sent to the control module 124 (1113) as before. The control module 124 obtains the capacity to be created and the hints from the allocation request (1119). The control module 124 sends the capacity to be created and the hints to the storage region allocation module 126 and requests the allocation of a storage region. The storage region allocation module 126 uses the mapping table 121 to determine which hard disk the designated storage region (20 GB in the present example) should be allocated from based on the hints (1121). Since the mapping table 121 is in a state as shown in FIG. 4, the storage region allocation module 126 allocates 20 GB (LBAs 0–41,943,039) from the hard disk 182 (1213). The reason for the storage region allocation module 126 not to allocate 20 GB from the hard disk 181 is to avoid sequential access and random access to coexist, since the AccessRandomnessHint for the storage region 91, which has already been allocated, is "10," while the AccessRandomnessHint for the storage region to be created is "0" (1203). The storage region allocation module 126 assigns the number 92 as the storage region number (1215) and updates the mapping table 121 as indicated in FIG. 5 (1125). As before, the updated mapping table 121 stores values for the AccessBandwidthWeight, AccessRandomnessHint and AccessLatencyHint that were received as hints. When the allocation of the storage region is completed, the storage region allocation module 126 notifies the control module 124 of the completion.

Next, the control module 124 sends the hints to the band allocation module 128 and requests the selection of an FC interface to connect the storage region to and the calculation of a parameter to be set for the band control module 150. In the setting described earlier, due to the fact that the AccessBandwidthWeight is "8," the parameter to be set for the band control module 150 is "60%" (1301). Next, the band allocation module 128 refers to the read/write processing table 141 and searches for an FC interface that can allocate 60% of its band (1303). As shown in FIG. 11, since the storage region 91 is already connected to the FC interface 111 and occupies 80% of the band of the FC interface 111, the band allocation module 128 connects the storage region 92 to the FC interface 112 (1307, 1311). Due to the fact that the computer that is authorized to access is the computer 302, the read/write processing table 141 is updated by the band allocation module 128 as indicated in FIG. 12 (1133). Upon completing the allocation of the band, the band allocation module 128 notifies the control module 124 of the completion.

Next, the control module 124 sends the hints to the cache allocation control module 130 and requests the selection of a dedicated cache capacity to be allocated to the storage region 92. According to the hints given before, since the AccessLatencyHint is "0," the cache allocation control module 130 does not allocate any dedicated cache to the storage region 92 (1137) and notifies the control module 124 of the completion of the processing.

The control module 124 notifies the request receiving module 122 of the completion of the allocation request. The request receiving module 122 notifies the management computer 500 of the completion of the allocation request.

Based on the above, the 20 GB storage region 92 requested by the administrator is created in the storage device 100 and becomes available for use from the computer 302. By using the hints, the storage region 92 is created in the hard disk 182, which is a hard disk different from the hard disk in which the storage region 91 is created, and is connected to the FC interface 112, which is different from the FC interface 111 to which the storage region 91 is connected.

[Creating the Third Storage Region 93]

Further, let us assume that the administrator operates the management computer 500 in order to allocate a storage region to the computer 302. The administrator uses the screen 610 displayed on the management computer 500 to instruct the creation of a storage region. The administrator inputs (1101) the following, for example:

"302" in the input field 611 for designating a computer;
"1 GB" in the input field 612 for designating the capacity of the storage region; and
"1" for AccessBandwidthWeight,
"10" for AccessRandomnessHint,
"10" for AccessLatencyHint in the respective fields 613–615 for inputting hints for creating a storage region; and the administrator presses the creating button 619 (1103). The management computer 500 obtains values inputted into the various input fields (1105), creates an allocation request based on CIM (1107), and issues the allocation request to the storage device 100 (1109). The allocation request created by the management computer 500 is received by the request receiving module 122 (1111) and sent to the control module 124 (1113) as before. The control module 124 obtains the capacity to be created and the hints from the allocation request (1119). The control module 124 sends the capacity to be created and the hints to the storage region allocation module 126 and requests the allocation of a storage region. The storage region allocation module 126 uses the mapping table 121 to determine which hard disk the designated storage region (1 GB in the present example) should be allocated from based on the hints (1121). Since the mapping table 121 is in a state as shown in FIG. 5, the storage region allocation module 126 allocates 1 GB (LBAs 41,943,040–44,040,191) from the hard disk 182 (1213). The reason for the storage region allocation module 126 to allocate 1 GB from the hard disk 181 is based on a determination that since the AccessRandomnessHint for the storage region 91, which has already been allocated, is "10" and the AccessRandomnessHint for the storage region to be created is "10" (1203), there would be little coexistence of different access patterns within the same hard disk, and since the AccessBandwidthWeight for the storage region to be created is "1" and therefore indicates low access frequency, there would be little influence on the storage region 91 already allocated (1211). In the present embodiment, the total AccessBandwidthWeight of the storage regions allocated within the same hard disk is specifically controlled to be less than 15 (1211). The randomness of accesses or the access bandwidth for a storage region already allocated can be measured to determine its actual value, and the actual value can be converted into the equivalent AccessRandomnessHint or AccessBandwidthWeight for comparison. The storage region allocation module 126 assigns the number 93 as the storage region number (1215) and updates the mapping table 121 as indicated in FIG. 6 (1125). As before, the updated mapping table 121 stores values for the AccessBandwidthWeight, AccessRandomnessHint and AccessLatencyHint that were received as hints. When the allocation of the storage region is completed, the storage region allocation module 126 notifies the control module 124 of the completion.

Next, the control module 124 sends the hints to the band allocation module 128 and requests the selection of an FC interface to connect the storage region to and the calculation of a parameter to be set for the band control module 150. In the setting as described earlier, due to the fact that the AccessBandwidthWeight is "1," the parameter to be set for the band control module 150 is "10%" (1301). Next, the band allocation module 128 refers to the read/write processing table 141 and searches for an FC interface that can allocate 10% of its band (1303). As shown in FIG. 12, the storage region 91 is already connected to the FC interface 111 and occupies 80% of the band. Furthermore, the storage region 92 is already connected to the FC interface 112 and occupies 60% of the band. However, 10% of the band can be allocated to either of the FC interfaces. The band allocation module 128 refers to the mapping table 121 (the current status is indicated in FIG. 6) and checks the AccessRandomnessHint value for the storage region 91 and for the storage region 92 (1305). The mapping table 121 indicates that the AccessRandomnessHint value for the storage region 91 is the same as the AccessRandomnessHint value for the storage region 93 newly created. As a result, the band allocation module 128 connects the storage region 93 to the FC interface 111, to which the storage region 91 is already connected (1311). Due to the fact that the computer that is authorized to access is the computer 302, the read/write processing table 141 is updated by the band allocation module 128 as indicated in FIG. 13 (1133). Upon completing the allocation of the band, the band allocation module 128 notifies the control module 124 of the completion.

Next, the control module 124 sends the hints to the cache allocation control module 130 and requests the selection of a dedicated cache capacity to be allocated to the storage region 93. According to the hints given before, since the AccessLatencyHint is "10" and the AccessRandomnessHint is "10," the cache allocation control module 130 determines the cache allocation ratio to be "100%" (1135); and since the capacity of the storage region 93 is 1 GB, the cache allocation control module 130 calculates the cache capacity to be allocated to the storage region 93 to be 1 GB (1139).

FIGS. 17(A) and 17(B) show diagrams of the cache allocation table 139. The cache allocation control module 130 refers to the cache allocation table 139 shown in FIG. 17(A) and confirms that the cache capacity not allocated to any particular storage region is 4 GB (1141). In order to allocate a 1 GB cache to the storage region 93, the cache allocation control module 130 updates the cache allocation table 139 as shown in FIG. 17(B) (1143). If, upon referring to the cache allocation table 139, the cache capacity not allocated to any particular storage region is found not to be sufficient for the cache capacity required for allocation, the cache allocation control module 130 notifies the control module 124 that an allocation could not be made. In the present example, since a 1 GB cache was successfully allocated, the cache allocation control module 130 notifies the control module 124 of the completion of cache allocation.

The control module 124 notifies the request receiving module 122 of the completion of the allocation request. The request receiving module 122 notifies the management computer 500 of the completion of the allocation request.

Based on the above, the 1 GB storage region 93 requested by the administrator is created in the storage device 100 and becomes available for use from the computer 302. By using the hints, the storage region 93 is created in the hard disk 181, which is the same hard disk as the hard disk in which the storage region 91 is created, and is connected to the FC interface 111, which is the same FC interface as the FC interface to which the storage region 91 is connected. Due to the fact that the access ratio for the storage region 93 can be restricted to 10% by the band control module 150 even if access frequency to the storage region 93 from the computer 302 increases, a priority, i.e., 80% of band, can be guaranteed for accesses to the storage region 91, which has high access frequency. Furthermore, due to the fact that sufficient cache is allocated for the storage region 93, processing time (latency) for read/write processing can be high-speed.

[Creating a Fourth Storage Region 94 (Error Due to Insufficient Band)]

Further, let us assume that the administrator operates the management computer 500 in order to allocate a storage region to the computer 302. The administrator uses the screen 610 displayed on the management computer 500 to instruct the creation of a storage region. The administrator inputs (1101) the following, for example:

"302" in the input field 611 for designating a computer;
"1 GB" in the input field 612 for designating the capacity of the storage region; and
"10" for AccessBandwidthWeight,
"0" for AccessRandomnessHint,
"0" for AccessLatencyHint in the respective fields 613–615 for inputting hints for creating a storage region; and the administrator presses the creating button 619 (1103). The management computer 500 obtains values inputted into the various input fields (1105), creates an allocation request based on CIM (1107), and issues the allocation request to the storage device 100 (1109). The allocation request created by the management computer 500 is received by the request receiving module 122 (1111) and sent to the control module 124 (1113) as before. The control module 124 obtains the capacity to be created and the hints from the allocation request (1119). The control module 124 sends the capacity to be created and the hints to the storage region allocation module 126 and requests the allocation of a storage region. The storage region allocation module 126 uses the mapping table 121 to determine which hard disk the designated storage region (1 GB in the present example) should be allocated from based on the hints (1121). Since the mapping table 121 is in the state as shown in FIG. 6, the storage region allocation module 126 allocates 1 GB (LBAs 0–2,097,151) from the hard disk 183 (1213). The reason for the storage region allocation module 126 to allocate 1 GB from the hard disk 183 is based on a determination that since the AccessBandwidthWeight is "10" and therefore large, this might cause some influence on the storage regions 91 and 92 already allocated if the new storage region were to be allocated from the hard disk 181 or 182 (1203, 1205, 1211). The storage region allocation module 126 assigns the number 94 as the storage region number (1215) and updates the mapping table 121 as indicated in FIG. 7 (1125). As before, the updated mapping table 121 stores values for the AccessBandwidthWeight, AccessRandomnessHint and AccessLatencyHint that were received as hints. When the allocation of the storage region is completed, the storage region allocation module 126 notifies the control module 124 of the completion.

Next, the control module 124 sends the hints to the band allocation module 128 and requests the selection of an FC interface to connect the storage region to and the calculation of a parameter to be set for the band control module 150. In the setting as described earlier, due to the fact that the AccessBandwidthWeight is "10," the parameter to be set for the band control module 150 is "80%" (1301). Next, the band allocation module 128 refers to the read/write processing table 141 and searches for an FC interface that can allocate 80% of its band (1303). As shown in FIG. 13, neither the FC interface 111 nor the FC interface 112 can additionally allocate 80% of its band (1307). The band allocation module 124 notifies the control module 124 of the failure to allocate the band (1399). Upon receiving the notice of the failure of band allocation (1129), the control module 124 requests a cancellation of the allocation of the storage region 94 to the storage region allocation module 126 (1131). The storage region allocation module 126 returns the mapping table 121 to the state indicated in FIG. 6. The control module 124 notifies the request receiving module 122 that the allocation request failed. The request receiving module 122 notifies the management computer 500 that the allocation request failed.

Based on the above, a 1 GB storage region requested by the administrator is not created in the storage device 100. The administrator can reset hints and press the creating button 619 again. Furthermore, when notifying the request receiving module 122 that the allocation request failed, the control module 124 can send "6" as the maximum allocatable value of the AccessBandwidthWeight (in the present example, since the remaining 40% of the FC interface 112 is the maximum allocatable band, a reverse look-up in the band parameter calculation table 129 results in "6"), and the request receiving module 122 can notify the management computer 500 of "6" as the AccessBandwidthWeight value, in order to notify the administrator that the maximum possible setting for the AccessBandwidthWeight is "6."

[Release Sequence]

Let us assume that the administrator operates the management computer 500 to release the storage region 91 from the computer 301. The administrator uses the screen 620 displayed on the management computer 500 to instruct the release of the storage region 91. The administrator checks the selection field 622 that corresponds to the storage region 91 on the screen 620 and presses the release button 629. The management computer 500 obtains the number "91" for the storage region selected in the selection field 622, creates a release request based on CIM, and issues the release request to the storage device 100. The release request created by the management computer 500 is issued to the storage device 100 by the CPU 510 of the management computer 500 via the network interface 590. The request receiving module 122 of the storage device 100 receives via the network interface 195 the release request issued by the management computer 500. Upon receiving the release request, the request receiving module 122 sends the release request to the control module 124. The control module 124 analyzes the request and determines that the request is a release request. The control module 124 requests the band allocation module 128 to release the band occupied by the storage region 91. The band allocation module 128 deletes information concerning the storage region 91 from the read/write control table 141.

The read/write control table 141 is updated as shown in FIG. 14. Next, the control module 124 requests the storage region allocation module 126 to release the blocks occupied by the storage region 91. The storage region allocation module 126 deletes information concerning the storage region 91 from the mapping table 121. The mapping table 121 is updated as shown in FIG. 8. When the release processing of the band by the band allocation module 128 and the release processing of the blocks by the storage region allocation module 126 are completed, the control module 124 notifies the request receiving module 122 of the completion of the release request. The request receiving module 122 notifies the management computer 500 of the completion of the release request. Upon receiving the notice of the completion of the release request, the management computer 500 updates the screen 620.

[System Configuration]

Figure 18:
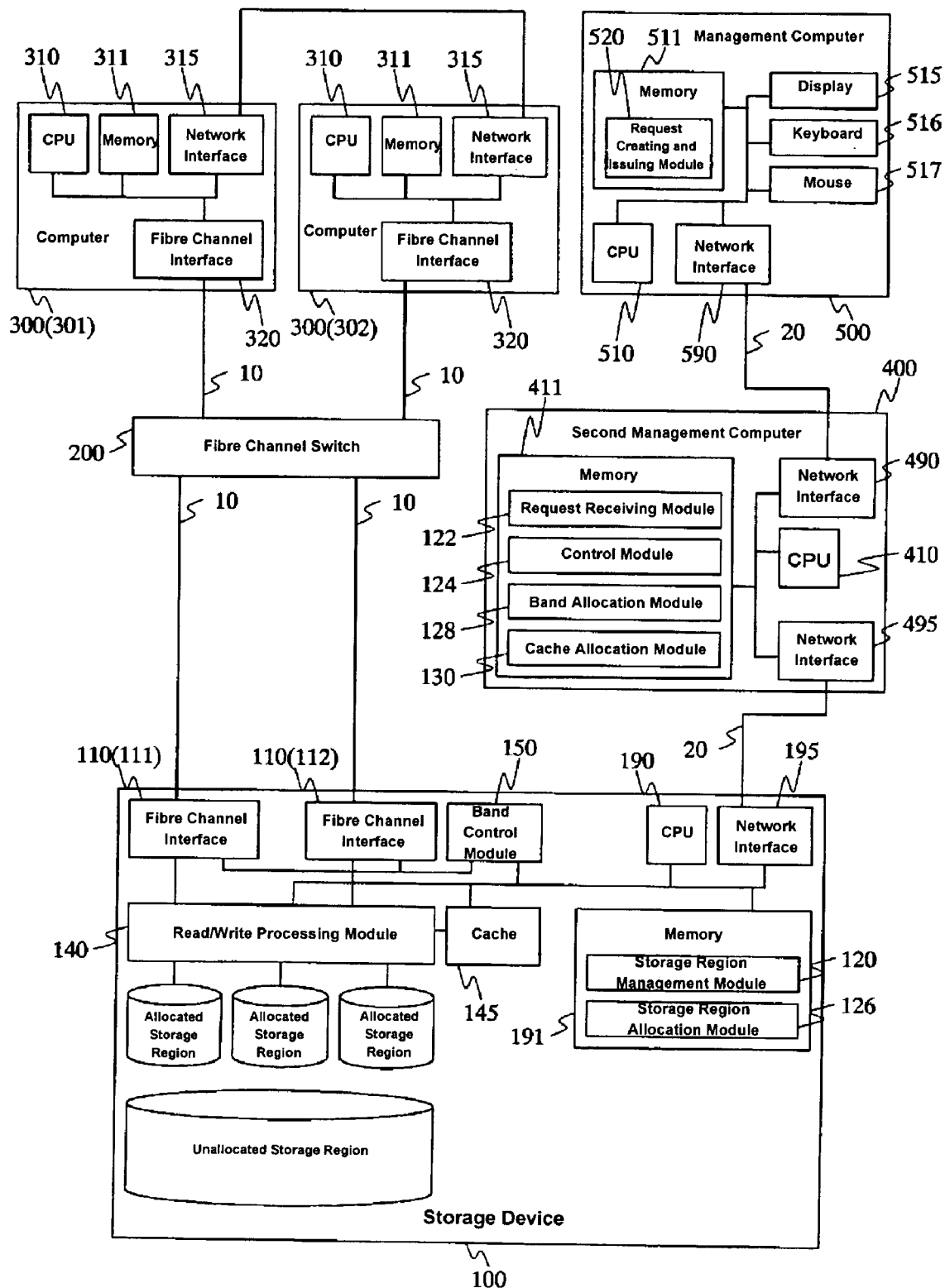
FIG. 18 is a diagram of the configuration of a computer system in accordance with a second embodiment of the present invention.

FIG. 18 shows a system configuration in accordance with a second embodiment of the present invention. Like the system in FIG. 1, in the system in FIG. 18, two computers 300 are connected to a storage device 100 via a fibre channel switch 200. To connect the computers 300 to the fibre channel switch 200 and the fibre channel switch 200 to the storage device 100, fibre channels 10 are used. The present system is provided with a second management computer 400 in addition to a management computer 500, in order to control the allocation and release of storage regions of the storage device 100. The management computer 500 and the second management computer 400, and the second management computer 400 and the storage device 100, are connected by dedicated communication lines 20.

[The Second Management Computer]

The second management computer 400 shown in FIG. 18 comprises a CPU 410 for governing the execution of programs, a memory 411 for storing the programs and information required for the execution of the programs, a network interface 490 for connecting with the management computer 500, and a network interface 495 for connecting with the storage device 100. The second management computer 400 is provided with a request receiving module 122 for receiving allocation requests and release requests from the management computer 500, a control module 124, a band allocation module 128, and a cache allocation control module 130. The control module 124, the band allocation module 128 and the cache allocation control module 130 provided in the second management computer 400 communicate with a storage region control module 120, a band control module 150 and a cache 145, respectively, provided in the storage device 100, via the network interface 495 and a network interface 195, to execute their processing. Although the request receiving module 122, the control module 124, the band allocation module 128 and the cache allocation control module 130 are provided in the second management computer 400 according to the present embodiment, the present invention can also be realized by providing the modules 122, 124, 128 and 130 in the management computer 500.

[Storage of Programs]

The request receiving module 122, the control module 124, the band allocation module 128, and the cache allocation control module 130 may be recorded as programs on recording media such as CD-ROM, stored on magnetic disks, loaded onto the memory 411 of the second management computer 400, and executed. Media for recording the programs can be recording media other than CD-ROM. Furthermore, the programs can be loaded onto the computers 300 from the recording media or used by accessing the recording media via a network.

[Allocation Sequence]

The processing described in the first embodiment can basically be applied as the allocation processing for storage regions according to the second embodiment. However, in accordance with the present embodiment, various modules provided in the second management computer 400 and various modules provided in the storage device 100 communicate with each other via the network interface 495 and the network interface 195 to execute their processing.

[System Configuration]

Figure 19:
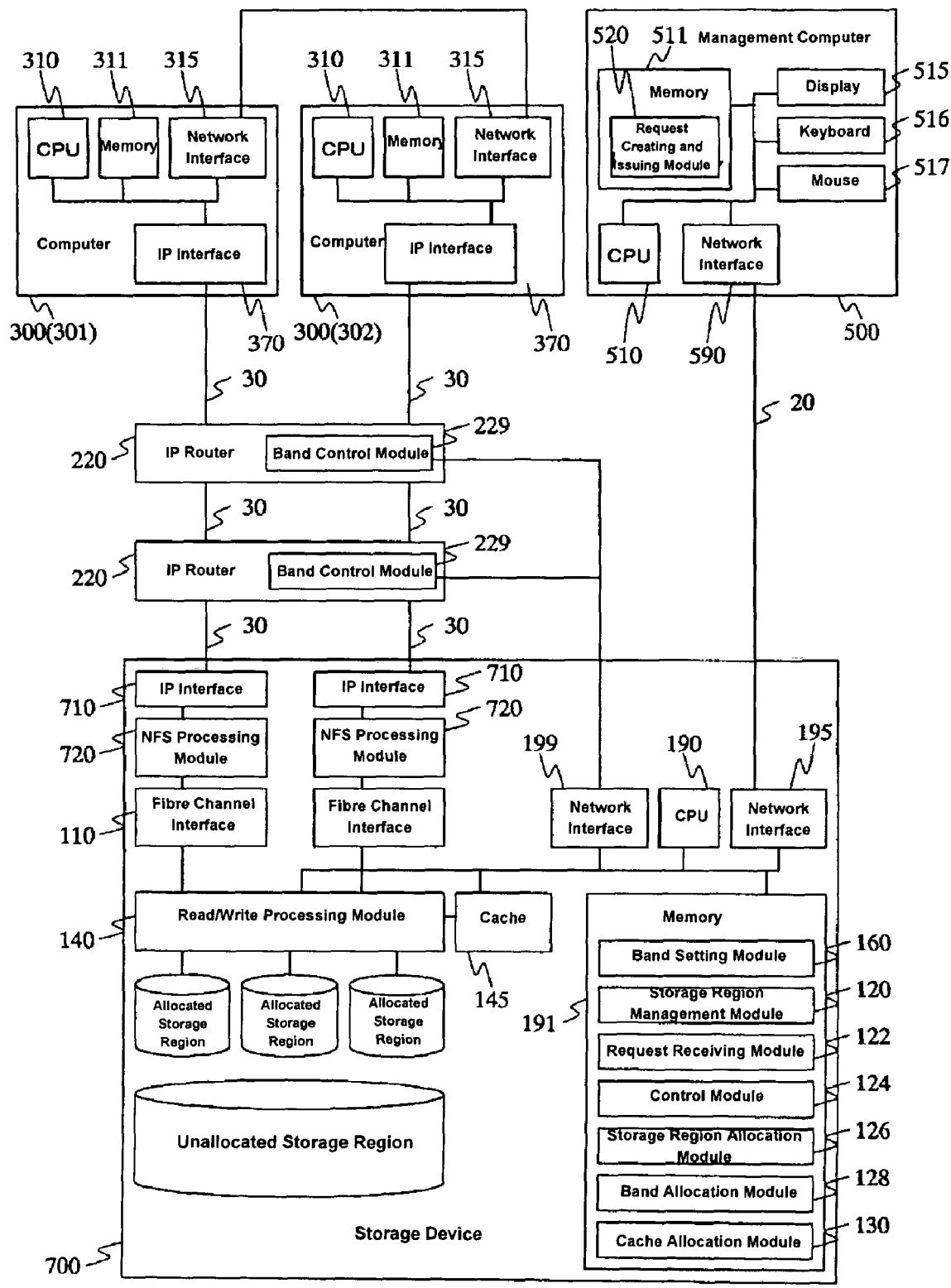
FIG. 19 is a diagram of the configuration of a computer system in accordance with a third embodiment.

FIG. 19 shows a system configuration in accordance with a third embodiment of the present invention. In the system shown in FIG. 19, two computers 300 are connected to a storage device 700 via two IP routers 220. The computers 300 and one of the IP routers 220, between the IP routers 220, and one of the IP routers 220 and the storage device 700 are connected by IP networks 30. For this reason, the computers 300 are each provided with an IP interface 370 instead of the fibre channel interface 320. Furthermore, like the first embodiment, a management computer 500 is provided in the present system to control the allocation and release of storage regions of the storage device 700. The management computer 500 and the storage device 700 are connected by a dedicated communication line 20.

[Mechanism of Band Control]

The mechanism of band control in the IP routers 220 is known as RSVP. Each of the IP routers 220 is provided with a band control module 229 to set RSVP.

[Storage Device]

The storage device 700 shown in FIG. 19 is provided with two IP interfaces 710. Between each set of the IP interface 710 and an FC interface 110 is a network file system processing module 720, which converts read/write requests received by the IP interface 710 into read/write requests that the FC interface 110 can interpret. The read/write processing that takes place from the FC interface 110 onward is the same as the processing in the first embodiment. However, there is no band control module provided in the storage device 700, and the band control modules 229 of the IP routers 220 are used instead. As a result, the storage device 700 is provided with a network interface 199 for communicating with the band control modules 229 of the IP routers 220, as well as an IP router band setting module 160 for setting band control parameters calculated by a band allocation module 128 in the band control modules 229 of the IP routers 220. The IP router band setting module 160 converts the parameters calculated by the band allocation module 128 into RSVP parameters of the IP routers 220 and performs band settings.

[Allocation Sequence]

The processing described in the first embodiment can basically be applied as the allocation processing for storage regions according to the present embodiment. However, in accordance with the present embodiment, when setting the parameters calculated by the band allocation module 128 of the storage device 700, the parameters are sent to the IP router band setting module 160, and the IP router band setting module 160 sets the RSVP parameters in the IP routers 220 via the network interface 199.

[System Configuration]

Figure 23:
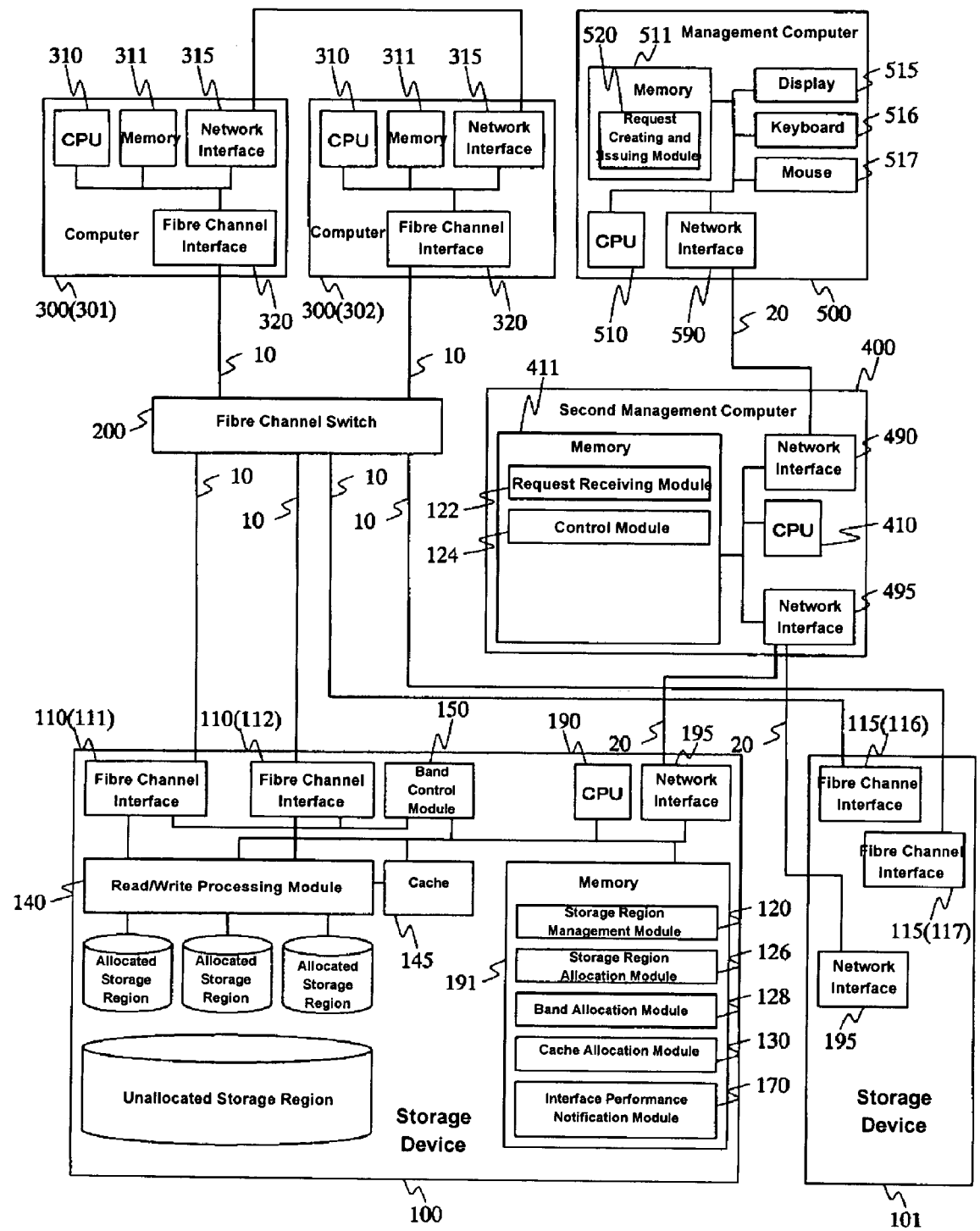
FIG. 23 is a diagram of the configuration of a computer system according to the fourth embodiment.

FIG. 23 shows a system configuration in accordance with a fourth embodiment of the present invention. Like FIG. 18 described in the second embodiment, the system shown in FIG. 23 is provided with a second management computer 400, which controls the allocation and release of storage regions in two storage devices 100 and 101. Although the band allocation module 128 and the cache allocation control module 130 are provided in the second management computer 400 according to the second embodiment, these modules are provided instead in the storage devices 100 and 101 according to the fourth embodiment. The storage device 101 has basically the same configuration as the storage device 100, but is provided with FC interfaces 115 (116 and 117) that can transfer data at higher speed than FC interfaces 110 (111 and 112) provided in the storage device 100. FC interfaces are available in 1 Gbps and 2 Gbps specifications, and in the present embodiment, the FC interfaces 110 are described as having a performance of 1 Gbps, while the FC interfaces 115 as having a performance of 2 Gbps.

[Interface Performance Notification Module]

A control module 124 of the second management computer 400 must ascertain the performance of FC interfaces of each of the storage devices 100 and 101. For this reason, an interface performance notification module 170 is provided in each of the storage devices 100 and 101 according to the present embodiment. Each of the interface performance notification modules 170 responds with performance information of the corresponding interface according to a performance query request from the control module 124 of the second management computer 400. Alternatively, the interface performance notification modules 170 may periodically send performance information to the control module 124. The performance information may include cache usage rate and access performance of each of the storage regions, and can be used as a standard for allocating storage regions and caches.

FIGS. 24(A) and 24(B) show diagrams of performance information. According to the present embodiment, performance information 171 such as shown in FIG. 24(A) is sent back from the interface performance notification module 170 of the storage device 100, and indicates that there are the FC interfaces 111 and 112, both of 1 Gbps. Similarly, performance information 172 such as shown in FIG. 24(B) is sent back from the interface performance notification module 170 of the storage device 101, and indicates that there are the FC interfaces 116 and 117, both of 2 Gbps. The control module 124 of the second management computer 400 stores these in a memory 411. The control module 124 of the second management computer 400 issues performance query requests and collects the performance information on FC interfaces when the second management computer 400 is activated, when a new storage device is detected, or when a collection request is received from the management computer 500.

[Storage of Programs]

The interface performance notification modules 170 newly provided in the present embodiment are recorded as a program on nonvolatile recording media such as ROM or magnetic disk devices within the storage devices (100 and 101), and are loaded onto a memory 191 and executed when the storage devices 100 and/or 101 is activated. Media for recording the program can be recording media other than ROM or magnetic disk devices (e.g., CD-ROM or Floppy® disks). Furthermore, the program can be loaded onto the computers 300 from the recording media and executed or can be loaded by accessing the storage media via a network.

[Band Parameter Calculation Table According to the Fourth Embodiment]

FIG. 25 shows a band parameter calculation table 129 used in the present embodiment. The difference between the band parameter calculation table 129 in FIG. 25 and the band parameter calculation table 129 in FIG. 16 is that there are two sets of parameters set for band control module, one set for 1 Gbps and another set for 2 Gbps, in the band parameter calculation table 129 in FIG. 25. Asterisks (*) in the band parameter calculation table 129 indicate that in the corresponding 1 Gbps FC interfaces, the allocation of bands that satisfy the "hint" is not feasible. For example, if the AccessBandwidthWeight is "10," the "hint" received can be satisfied with a band setting of 80% on 2 Gbps FC interfaces; however, since the "hint" cannot be satisfied on 1 Gbps FC interfaces, storage regions created cannot be connected to the 1 Gbps FC interfaces. Although the difference between two types of performance has been described in the present embodiment, a similar band parameter calculation table can be created when there are FC interfaces of 10 Gbps in addition to the FC interface types according to the present embodiment.

[Allocation Sequence]

Figure 26:
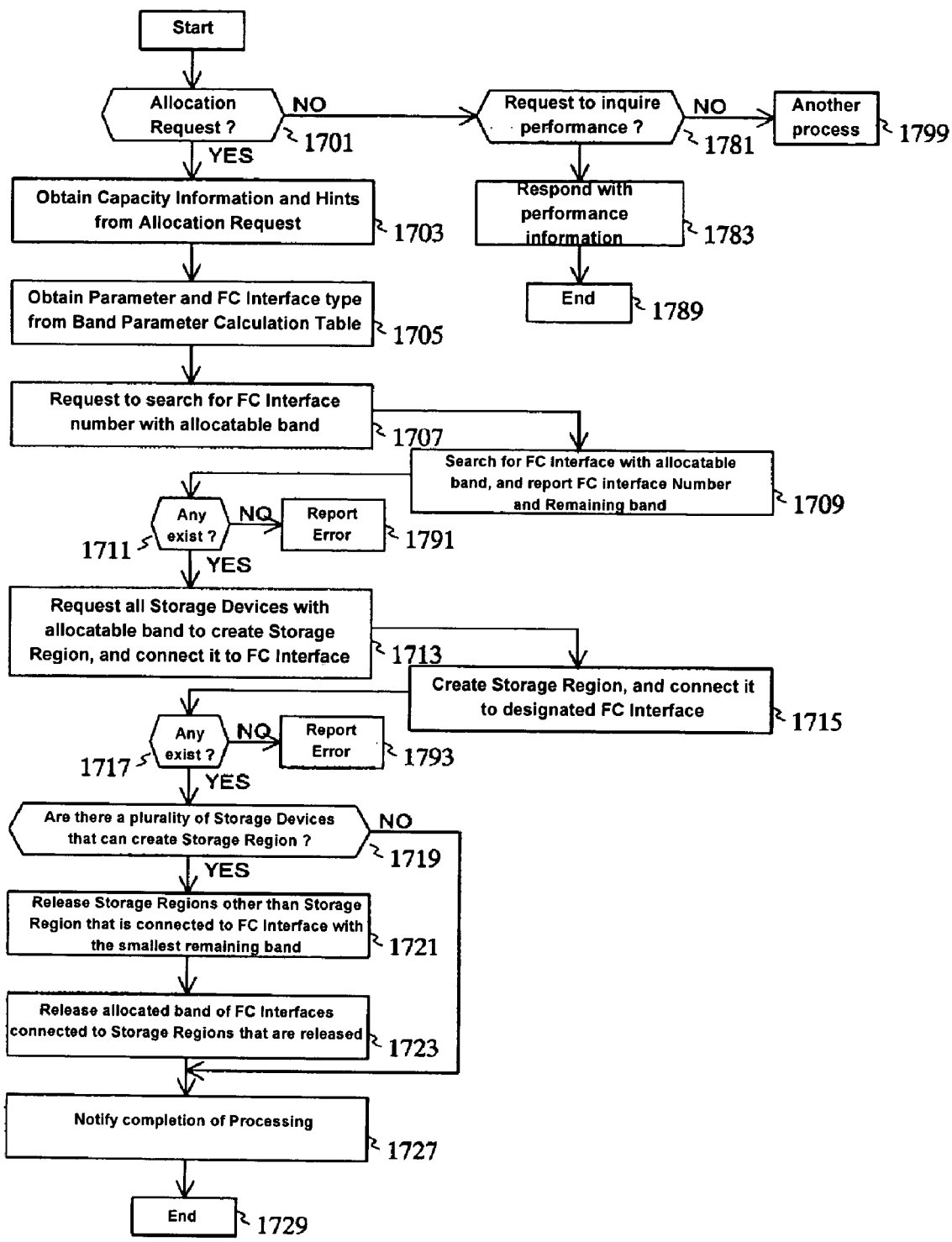
FIG. 26 is a flowchart of an allocation processing in accordance with a fourth embodiment of the present invention.

FIG. 26 shows a flowchart of an allocation processing according to the fourth embodiment.

Referring to FIG. 26, the allocation of storage regions, the selection of an FC interface, and band setting in accordance with the present embodiment will be described. The present embodiment differs from the first embodiment in that when creating storage regions and finding bands required based on "hints," there is a possibility of finding a storage device with FC interfaces that cannot connect with the storage regions created. To perform this processing, the second management computer 400 utilizes performance information (171 and 172) on the FC interfaces 110 and 115 collected from various storage devices, as well as the band parameter calculation table 129. We will use the flowchart in FIG. 26 to describe the flow of the processing, with emphasis on the processing by the control module 124 of the second management computer 400.

[Creating High-Speed Storage Regions (Selecting a High-Speed FC Interface):]

Let us assume that an administrator operates the management computer 500 in order to allocate a storage region to the computer 301. The administrator uses a screen 610 displayed on the management computer 500 to instruct the creation of a storage region. The administrator inputs the following, for example:

"301" in an input field 611 for designating a computer;
"1 GB" in an input field 612 for designating the capacity of the storage region; and
"10" for AccessBandwidthWeight,
"0" for AccessRandomnessHint,
"0" for AccessLatencyHint in the respective fields 613–615 for inputting hints for creating a storage region; and the administrator presses a creating button 619. The management computer 500 obtains values inputted into the various input fields, creates an allocation request based on CIM, and issues the allocation request to the second management computer 400. A request receiving module 122 of the second management computer 400 upon receiving the allocation request sends the allocation request to the control module 124. The control module 124 analyzes the request and determines that the request is an allocation request (1701). Upon determining that the request is an allocation request, the control module 124 first obtains the capacity to be created and the hints (1703). Based on the AccessBandwidthWeight, which was received as one of the hints, the control module 124 refers to the band parameter calculation table 129 and obtains the parameter to be set and the type of the FC interface to which the parameter can be set (1705). In the present example, since the AccessBandwidthWeight is "10," "80%" must be set to a 2 Gbps FC interface. In other words, connecting the new storage region to a 1 Gbps FC interface would not satisfy the hint. Based on the result of referring to the band parameter calculation table 129 and the performance information (171, 172), the control module 124 of the second management computer 400 requests the band allocation module 128 of the storage device 101 to search for an FC interface that can allocate 80% of its band (1707). Upon confirming that there is an FC interface that can allocate a band, the band allocation module 128 sets the band parameter to the band control module and sends back the FC interface number and the remaining bands of the FC interface to the control module 124 (1709). Next, if there is an FC interface that can allocate the band (1711), the control modules 124 designates the capacity to be created (1 GB in this case), the FC interface number and the AccessRandomnessHint, and requests a storage region allocation module 126 to create a storage region and to connect the storage region created to the predetermined FC interface (1713). If a storage region that matches the request can be created, the storage region allocation module 126 creates such a storage region, connects the storage region created to the designated FC interface, and notifies the control module 124 of the second management computer 400 of the completion of the processing (1715). The control module 124 of the second management computer 400 notifies the management computer 500 of the completion of the processing (1727).

[Creating a Low-Speed Storage Region]

Next, a situation in which the AccessBandwidthWeight is "1" will be described. In this case, as before, the second management computer 400 refers to the band parameter calculation table 129 and obtains the parameter to be set and the type of the FC interface to which the parameter can be set (1705). In this case, since the AccessBandwidthWeight is "1," an FC interface that must be secured is an FC interface that can set "20%" of its band if the FC interface is 1 Gbps, and an FC interface that can set "10%" of its band if the FC interface is 2 Gbps. The second management computer 400 requests each of the storage devices 100 and 101 to search for an FC interface that can allocate a band (1707). The control module 124 designates "20%" to the storage device 100 since it has 1 Gbps FC interfaces, and "10% to the storage device 101 since it has 2 Gbps FC interfaces. Upon confirming that there is an FC interface that can allocate the band, the band allocation module 128 of each of the storage devices 100 and 101 sets the band parameter to the corresponding band control module and sends back the FC interface number and the remaining bands of the FC interface to the control module 124 (1709). Next, the control module 124 designates the capacity to be created and the FC interface number to each of the storage devices 100 and 101 with the FC interface that can allocate the band, and requests the storage region allocation modules 126 to create storage regions and to connect the storage regions created to the predetermined FC interfaces (1713). If creating the storage regions is successful in a plurality of storage devices (1719), the control module 124 requests each of the storage region allocation modules 126 to release all of the storage regions except the storage region connected to the FC interface with the least amount of remaining band (1721). Furthermore, the control module 124 requests each of the band allocation modules 128 to release bands of FC interfaces to which storage regions that were not used were connected (1723). When the release processing is completed, the control module 124 of the second management computer 400 notifies the management computer 500 of the completion of the processing (1727).

[Algorithm for Selecting FC Interface]

First, let us elaborate on the selection of the FC interface with "the least amount of remaining band" In a state indicated in FIG. 12, for example, the FC interface 111's band is already 80% allocated to the storage region 91, while the FC interface 112's band is already 60% allocated to the storage region 92. When allocating 10% of the band to the storage region 93, there are two choices, i.e., the FC interfaces 111 and 112; by allocating 10% of the FC interface 111's band as shown in FIG. 13, the remaining band of the FC interface 111 becomes 10%, and the remaining band of the FC interface 112 becomes 40%. On the other hand, if 10% of the FC interface 112's band is allocated, the remaining band of the FC interface 111 becomes 20%, while the remaining band of the FC interface 112 becomes 30%. The former situation, i.e., allocating 10% of the band of the FC interface 111, leaves a larger, unallocated and continuous band of 40% (as the remaining band of the FC interface 112). Naturally, the larger the unallocated, continuous band, the less the number of cases of error resulting from failure to allocate bands in allocation processing of storage regions.

By performing the processing as described above and using hints, which are designated when storage regions are created, to allocate storage regions, settings that were conventionally done separately from creating storage regions, such as setting bands between computers and storage regions and setting cache capacities allocated to storage regions, can be done at the same time. As a result, administrators do not have to know the know-how for selecting parameters for band setting and cache allocation volumes corresponding to hints that are designated when storage regions are created, and are not required to have high-level knowledge. Furthermore, there is no risk of making a wrong selection of parameters for band setting, which can eliminate setting errors of band parameters.

Furthermore, band setting and cache allocation volume setting can be performed without making any changes to conventional CIM interfaces and request formats.

According to the present invention, settings by an administrator for guaranteeing access performance from computers to allocated storage regions can be automated by allocating storage regions using region allocation request principles (hints) for storage regions that are designated when storage regions are allocated, and by using the hints to execute performance guarantee for band control.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A storage device comprising:
   at least one storage for storing data to be accessed by at least one computer;
   an access processing module that controls data access between the at least one storage and the at least one computer;
   a management interface that receives from a management computer a storage region allocation request to allocate a storage region to the at least one computer;
   a storage region allocation module that allocates to the at least one computer, based on the storage region allocation request, an unallocated storage region in the at least one storage in a manner accessible by the at least one computer; and
   a performance allocation module that allocates to the at least one computer, based on the storage region allocation request, performance of at least one target module that affects data access between the at least one computer and the storage region allocated.

2. A storage device according to claim 1, wherein the at least one target module includes an interface that connects to the at least one computer, and the performance allocation module is a band control module for controlling band performance in the interface.

3. A storage device according to claim 1, further comprising a cache that temporarily stores data to be moved between the storage and the at least one computer, wherein the performance allocation module is a cache allocation control module that controls, based on the storage region allocation request, an allocation amount of the cache that affects data access between the at least one computer and the storage region allocated.

4. A storage device according to claim 1, further comprising a storage region management module that sets, according to an allocation release request from the management computer to release the storage region allocated, the storage region allocated to an unallocated storage region, wherein the performance allocation module releases, according to the allocation release request, performance guarantee that is set to the at least one target module.

5. A storage device according to claim 1, wherein the performance allocation module controls, according to the storage region allocation request and at least one actual performance value of the at least one target module, the at least one target module to allocate to the at least one computer performance that affects data access between the at least one computer and the storage region allocated.

6. A storage device according to claim 1, wherein the storage region allocation request includes a policy concerning at least one of an access band width, a randomness of accesses and an access response time for the storage region that is a target of the storage region allocation request, and the performance allocation module allocates to the at least one computer performance of the at least one target module that affects data access between the at least one computer and the storage region allocated based on at least one performance parameter that is obtained by converting the storage region allocation request based on the policy for the storage region that is a target of the storage region allocation request.

7. A storage device according to claim 1, further comprising a plurality of disk drives that manage a plurality of storage regions, wherein the storage region allocation request includes a policy concerning a randomness of accesses for the storage region that is a target of the storage region allocation request, and the storage region allocation module specifies at least one of the plurality of disk drives to allocate the unallocated storage region according to the policy concerning the randomness of accesses included in the storage region allocation request and random access performance information of parts of the plurality of storage regions that are already allocated to the disk drives.

8. A storage device according to claim 1, further comprising a plurality of disk drives that manage a plurality of storage regions, wherein the storage region allocation request includes a policy concerning a randomness of accesses and an access band width for the storage region that is a target of the storage region allocation request, and the storage region allocation module specifies at least one of the plurality of disk drives to allocate the unallocated storage region according to the policy concerning the randomness of accesses and the access band width included in the storage region allocation request and random access performance information and an access band width of parts of the plurality of storage regions that are already allocated to the disk drives.

9. A storage device according to claim 1, further comprising a plurality of disk drives that manage a plurality of storage regions, wherein the storage region allocation request includes a policy concerning a randomness of accesses for the storage region that is a target of the storage region allocation request, and the storage region allocation module specifies an interface that connects to the computer to which the unallocated storage region is allocated, according to the policy concerning the randomness of accesses included in the storage region allocation request and random access performance of parts of the plurality of storage regions that are already allocated to the disk drives.

10. A storage device according to claim 1, further comprising a plurality of disk drives that manage a plurality of storage regions, wherein the storage region allocation request includes a policy concerning a randomness of accesses and an access band width for the storage region that is a target of the storage region allocation request, and the storage region allocation module specifies an interface to be connected to the computer to which the unallocated storage region is allocated, according to the policy concerning the randomness of accesses and the access band width included in the storage region allocation request and random access performance and an access band width of parts of the plurality of storage regions that are already allocated to the disk drives.

11. A storage device comprising:
    at least one storage for storing data to be accessed by at least one computer;
    an access processing module that controls data access between the at least one storage and the at least one computer;
    a management interface the receives from a management computer a storage region allocation request to allocate a storage region to the at least one computer;
    a storage region allocation module that allocates based on the storage region allocation request, an unallocated storage region in the at least one storage to the at least one computer in a manner accessible by the at least one computer;
    a performance setting module that instructs an external information processing device to allocate to the at least one computer, based on the storage region allocation request, performance that affects data access between the at least one computer and the storage region allocated.

12. A storage device according to claim 11, wherein the at least one target module includes an interface that connects to the at least one computer, and the performance allocation module is a band control module for controlling band performance in the interface.

13. A storage device according to claim 11, further comprising a cache that temporarily stores data moved between the storage and the at least one computer, wherein the performance allocation module is a cache allocation control module that controls, based on the storage region allocation request, an allocation amount of the cache that affects data access between the at least one computer and the storage region allocated.

14. A storage device according to claim 11, further comprising a storage region management module that sets, according to an allocation release request from the management computer to release the storage region allocated, the storage region allocated to an unallocated storage region, wherein the performance allocation module releases, according to the allocation release request, performance guarantee that is set to the at least one target module.

15. A storage device according to claim 11, wherein the performance allocation module controls, according to the storage region allocation request and at least one actual performance value of the at least one target module, the at least one target module to allocate to the at least one computer performance that affects data access between the at least one computer and the storage region allocated.

16. A storage device according to claim 11, wherein the storage region allocation request includes a policy concerning at least one of an access band width, a randomness of accesses and an access response time for the storage region that is a target of the storage region allocation request, and the performance allocation module allocates to the at least one computer performance of the at least one target module that affects data access between the at least one computer and the storage region allocated based on at least one performance parameter that is obtained by converting the storage region allocation request based on the policy for the storage region that is a target of the storage region allocation request.

17. A storage device according to claim 11, further comprising a plurality of disk drives that manage a plurality of storage regions, wherein the storage region allocation request includes a policy concerning a randomness of accesses included in the storage region allocation request and random access performance information of parts of the plurality of storage regions that are already allocated to the disk drive.

18. A storage device according to claim 11, further comprising a plurality of disk drives that manage a plurality of storage regions, wherein the storage region allocation request includes a policy concerning a randomness of accesses and an access band width for the storage region that is a target of the storage region allocation request, and the storage region allocate the unallocated storage region according to the policy concerning the allocation module specifies at least one of the plurality of disk drives to randomness of accesses and the access band width included in the storage region allocation request and rand9m access performance information and an access band width of parts of the plurality of storage regions that are already allocated to the disk drives.

19. A storage device according to claim 11, further comprising a plurality of disk drives that manage a plurality of storage regions, wherein the storage region allocation request includes a policy concerning a randomness of accesses for the storage region that is a target of the storage region allocation request, and the storage region allocation module specifies an interface that connects to the computer to which the unallocated storage region is allocated, according to the policy concerning the randomness of accesses included in the storage region allocation request and random access performance of parts of the plurality of storage regions that are already allocated to the disk drives.

20. A storage device according to claim 11, further comprising a plurality of disk drives that manage a plurality of storage regions, wherein the storage region allocation request includes a policy concerning a randomness of accesses and an access band width for the storage region that is a target of the storage region allocation request, and the storage region allocation module specifies an interface to be connected to the computer to which the unallocated storage region is allocated, according to the policy concerning the randomness of accesses and the access band width included in the storage region allocation request and random access performance and an access band width of parts of the plurality of storage regions that are already allocated to the disk drives.

21. A performance guarantee method for a storage device including at least one storage for storing data to be accessed by at least one computer, and an access processing module that controls data access between the at least one storage and the at least one computer, the performance allocation method comprising the steps of:
    receiving from a management computer a storage region allocation request to allocate a storage region to the at least one computer;
    allocating to the at least one computer, based on the storage region allocation request, an unallocated storage region in the at least one storage in a manner accessible by the at least one computer; and
    allocating to the at least one computer, based on the storage region allocation request, performance of at least one target module that affects data access between the at least one computer and the storage region allocated.

22. A management method for a management computer that connects to a storage device including at least one storage for storing data to be accessed by at least one computer and an access processing module that controls data access between the at least one storage and the at least one computer, the management method comprising the steps of:
    receiving a storage region allocation request to allocate a storage region to the at least one computer;
    instructing the storage device to allocate to the at least one computer, based on the storage region allocation request, an unallocated storage region in the at least one storage in a manner accessible by the at least one computer; and
    instructing a performance allocation module to allocate, based on the storage region allocation request, performance of at least one target module that affects data access between the at least one computer and the storage region allocated.

23. A management program to be executed by a management computer that connects to a storage device including at least one storage for storing data to be accessed by at least one computer and an access processing module that controls data access between the at least one storage and the at least one computer, wherein the management program causes the management computer to perform the steps of:
    receiving a storage region allocation request to allocate a storage region to the at least one computer;

instructing the storage device to allocate to the at least one computer, based on the storage region allocation request, an unallocated storage region in the at least one storage in a manner accessible by the at least one computer; and instructing the storage device to allocate, based on the storage region allocation request, performance of at least one target module that affects data access between the at least one computer and the storage region allocated.

24. A management program according to claim 23, wherein the management program causes the management computer to perform the step of receiving the storage region allocation request from a second management computer independent of the management computer.

25. A management program to be executed by a management computer that connects to a storage device including at least one storage for storing data to be accessed by at least one computer and an access processing module that controls data access between the at least one storage and the at least one computer, wherein the management program causes the management computer to perform the steps of:

receiving a storage region allocation request to allocate a storage region to the at least one computer;

receiving from the storage device actual performance values of a plurality of target modules in the storage device;

instructing the storage device to allocate to the at least one computer, based on the storage region allocation request, an unallocated storage region in the at least one storage in a manner accessible by the at least one computer; and instructing the storage device to specify at least one of the plurality of target modules to allocate, based on the storage region allocation request and the actual performance values of the plurality of target modules, performance of the at least one target module that affects data access between the at least one computer and the storage region allocated, and to allocate the performance of the at least one of the plurality of target modules specified to the at least one computer.

26. A network system comprising at least one computer, a storage device, a first management computer and a second management computer mutually connected through a network, wherein the second management computer comprises:

a receiving module that receives a storage region allocation request from the first management computer to allocate a storage region to the at least one computer;

a control module that instructs the storage device to allocate to the at least one computer, based on the storage region allocation request, an unallocated storage region in the at least one storage in a manner accessible by the at least one computer; and a performance allocation module that issues a performance allocation instruction to the storage device to allocate, based on the storage region allocation request, performance of the at least one target module that affects data access between the at least one computer and the storage region allocated, and wherein the storage device comprises:

at least one storage for storing data to be accessed by the at least one computer;

an access processing module that controls data access between the at least one storage and the at least one computer;

a management interface that receives from the second management computer a storage region allocation request to allocate the storage region and the performance allocation instruction;

a storage region allocation module that allocates based on the storage region allocation request an unallocated storage region in the at least one storage to the at least one computer in a manner accessible by the at least one computer;

a band control module that allocates to the at least one computer, according to the performance allocation instruction, performance of at least one target module that affects data access between the at least one computer and the storage region allocated.

* * * * *